United States Patent
Koerner et al.

(10) Patent No.: US 6,611,556 B1
(45) Date of Patent: Aug. 26, 2003

(54) IDENTIFICATION SYSTEM FOR MONITORING THE PRESENCE/ABSENCE OF MEMBERS OF A DEFINED SET

(76) Inventors: Steve J. Koerner, 2313 N. Singague Cir., Mesa, AZ (US) 85203; Ralph J. Koerner, P.O. Box 1320, Ramona, CA (US) 92065

( * ) Notice: Subject to any disclaimer, the term of this patent is extended or adjusted under 35 U.S.C. 154(b) by 0 days.

(21) Appl. No.: 09/673,116
(22) PCT Filed: May 17, 2000
(86) PCT No.: PCT/US00/13478
  § 371 (c)(1),
  (2), (4) Date: Oct. 10, 2000
(87) PCT Pub. No.: WO00/72461
  PCT Pub. Date: Nov. 30, 2000

Related U.S. Application Data
(60) Provisional application No. 60/135,452, filed on May 21, 1999.

(51) Int. Cl.$^7$ .............................................. H04B 17/00
(52) U.S. Cl. ................. 375/224; 340/10.52; 340/572.1; 340/573.4; 342/44
(58) Field of Search ........................ 375/224; 340/531, 340/573.4, 572.8, 539, 572.1, 10.1, 10.2, 10.52; 342/44

(56) References Cited

U.S. PATENT DOCUMENTS

| | | | |
|---|---|---|---|
| 4,149,144 A | | 4/1979 | Diefenderfer ................ 370/255 |
| 4,223,830 A | | 9/1980 | Walton ......................... 235/380 |
| 4,289,931 A | * | 9/1981 | Baker ........................... 379/247 |
| 4,471,345 A | | 9/1984 | Barrett, Jr. ................. 340/572.1 |
| 4,540,849 A | | 9/1985 | Oliver .......................... 379/106 |
| 4,792,796 A | * | 12/1988 | Bradshaw et al. ........... 340/539 |
| 4,924,211 A | * | 5/1990 | Davies ..................... 340/573.4 |
| 4,980,671 A | * | 12/1990 | McCurdy .................. 340/568.1 |
| 5,032,823 A | * | 7/1991 | Bower et al. ............. 340/572.8 |
| 5,052,019 A | | 9/1991 | Ziegler ........................ 375/239 |
| 5,182,543 A | * | 1/1993 | Siegel et al. ................. 340/573 |
| 5,294,931 A | | 3/1994 | Meier ........................... 342/44 |
| 5,387,915 A | | 2/1995 | Moussa et al. ............... 342/40 |
| 5,430,441 A | | 7/1995 | Bickley et al. ............. 340/10.2 |
| 5,457,461 A | | 10/1995 | Schuermann ................. 342/42 |
| 5,500,651 A | | 3/1996 | Schuermann ................. 342/42 |
| 5,557,280 A | | 9/1996 | Marsh et al. ................. 342/44 |
| 5,640,151 A | | 6/1997 | Reis et al. ............. 340/825.54 |
| 5,686,902 A | | 11/1997 | Reis et al. ............. 340/825.54 |
| 5,963,144 A | | 10/1999 | Kruest ........................ 340/10.1 |
| 6,025,780 A | | 2/2000 | Bowers et al. ............ 340/572.3 |
| 6,057,759 A | | 5/2000 | Marsh ......................... 340/539 |
| 6,130,620 A | * | 10/2000 | Pinnow et al. ........... 340/825.3 |
| 6,225,906 B1 | * | 5/2001 | Shore ....................... 340/573.4 |

* cited by examiner

Primary Examiner—Shuwang Liu
(74) Attorney, Agent, or Firm—Freilich, Hornbaker & Rosen

(57) ABSTRACT

A system which allows multiple senders to asynchronously transmit identification codes via a common communication channel (e.g., RF) to enable a central monitor to identify the presence (or absence) of each sender within the monitor's detection zone. Each sender is configured to repeatedly transmit a uniquely encoded identification frame. A frame, in accordance with the invention, is comprised of pulses spaced to minimize pulse collisions and configured to tolerate occasional collisions without impairing the monitor's ability to separately identify each transmitting sender. Each sender is configured to repeatedly transmit a unique identification frame characterized by a pulse pattern comprised of active intervals spaced by inactive (or "quiet") intervals. The inactive intervals have variable length durations which are preferably pseudorandomly selected so that each sender defines a unique sequence of inactive interval durations.

35 Claims, 24 Drawing Sheets

I SENDER ID PULSES
G GROUP SYNCH PULSES
D DATA PULSES

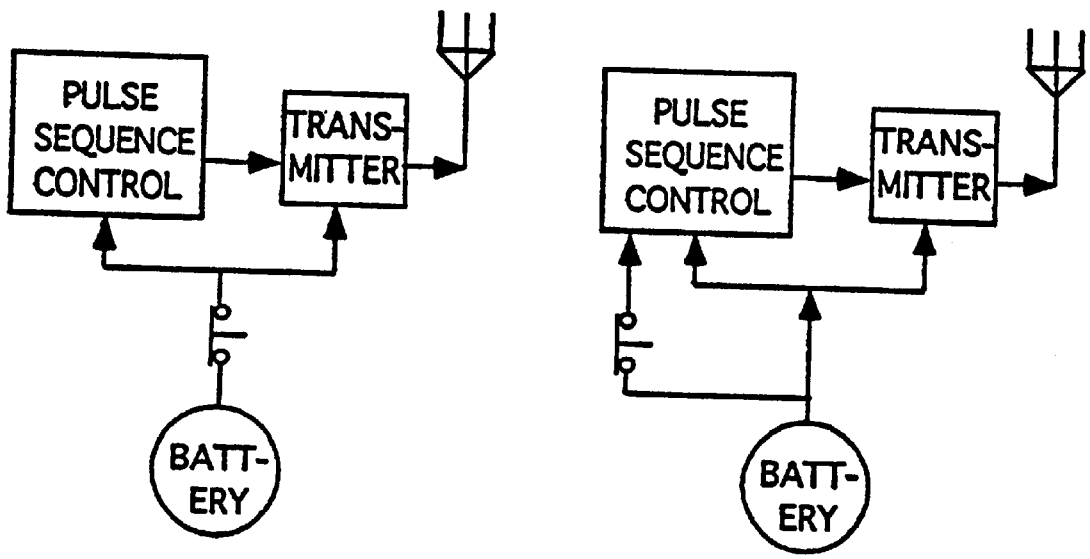
FIGURE 23A          FIGURE 23B
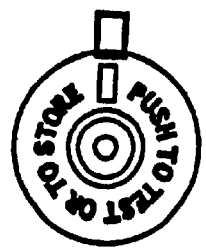
FIGURE 23C1
FIGURE 23C2
FIGURE 23C3
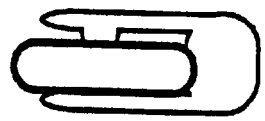
FIGURE 23C4

IDENTIFICATION SYSTEM FOR MONITORING THE PRESENCE/ABSENCE OF MEMBERS OF A DEFINED SET

This application is a national stage filing under international application PCT/US00/13478 pursuant to 35 U.S.C. 371 which claim benefit of 60/135,452 file May. 21, 1999.

FIELD OF THE INVENTION

This invention relates generally to systems e.g., radio frequency identification (RFID), for identifying the presence or absence of members of a defined member set. More particularly, the invention is directed to a system which includes multiple active senders and a central monitor, with each sender being configured to repeatedly transmit a signal representing a uniquely encoded identification frame. A composite signal received by the monitor is decoded to separately identify each of the transmitting senders.

BACKGROUND OF THE INVENTION

Various RFID systems are described in the patent and technical literature which are used to identify the presence of specially configured identification tags within a prescribed zone. Depending upon the system application, the tags can be affixed to a set of inanimate objects, or animals, or humans. Prior literature describes both passive tags which require interrogation and active tags which are powered and can initiate an identification signal transmission.

SUMMARY OF THE INVENTION

The present invention is directed to a system which allows multiple senders to asynchronously transmit identification codes via a common communication channel (e.g., RF) to enable a central monitor to identify the presence (or absence) of each sender within the monitor's detection zone. Each sender is configured to repeatedly transmit a uniquely encoded identification frame. A frame, in accordance with the invention, is comprised of pulses spaced to minimize pulse collisions and configured to tolerate occasional collisions without impairing the monitor's ability to separately identify each transmitting sender.

Systems in accordance with the invention are useful in a wide variety of applications for monitoring the presence (or absence) of a member of a defined set of members. For example, the teachings of the invention can be used in a warehouse system to log the presence of items in inventory or in a man-overboard (MOB) system for monitoring the absence of persons on a recreational boat. The indication of presence or absence can be used to either directly actuate an output device, e.g., an alarm, or can be logged for further processing by a host computer. In such systems, each member of the set (e.g., each inventory item or each person on the boat) carries a sender.

Senders, in accordance with preferred embodiments of the invention, comprise small inexpensive electronic devices which can be carried by, attached to, or worn by the members of the set being monitored. Each sender is preferably self powered, typically by a battery, and is capable of periodically transmitting, low power, short duration pulses over a long life which can, in some applications, be measured in years. A power level is selected to support a communication range appropriate to the application; e.g., from less than one hundred to several hundred feet.

In accordance with the invention, each sender is configured to repeatedly transmit a unique identification frame characterized by a pulse pattern comprised of active intervals spaced by inactive (or "quiet") intervals. The inactive intervals have variable length durations which are preferably pseudorandomly selected so that each sender defines a unique sequence of inactive interval durations.

Active intervals in accordance with the invention are comprised of one or more pulse intervals. That is, in a first embodiment, each active interval can comprise a coded burst of multiple pulses. In a different embodiment, each active interval comprises a single pulse. A quiet interval is defined between successive active intervals.

In accordance with certain preferred embodiments of the invention, the durations of quiet intervals within a frame are used to define the identification code (i.e., ID code) of each sender. As an example, an identification frame format can comprise six active intervals bounding five quiet intervals. The duration of each quiet interval can, for example, have a resolution of between 1 and 64 clock periods. These exemplary quantities would provide for a pool of $64^5$ possible ID codes. A different ID code is assigned to each of the multiple senders. A typical clock period can equal 100 microseconds, for example, so that an identification frame using the aforementioned exemplary numbers could have a duration of up to 32.6 milliseconds [i.e., (6 active intervals*100 microseconds)+(5 quiet intervals * 64*100 microseconds)]. In such an exemplary embodiment, the pulse duty cycle of each sender is extremely low, i.e., the sender transmits for only 600 microseconds out of each identification frame duration of 32.6 milliseconds. In certain applications of the invention, sender transmission cycles can be comprised of an identification frame and a silent period. This further reduces the duty cycle and power consumption of each sender.

Moreover, the number of active senders sharing a common channel in a typical application of the invention is several orders of magnitude less then the number of possible ID codes. All of the foregoing factors contribute to minimize the occurrence of pulse collisions on the channel and enable a central monitor to interpret a received composite signal to reliably and unambiguously identify each transmitting sender.

More particularly, embodiments of the invention are characterized by sender pulse patterns which are inherently sparse, i.e., low density, and inherently redundant. Accordingly, embodiments of the invention are able to tolerate pulse collisions by effectively treating colliding pulses as belonging to every sender that might otherwise be identified by other pulses in the received composite signal. Because of the very low average transmission time of each sender and the inherent tolerance to pulse collisions, embodiments of the invention are able to accommodate a large number of asynchronously transmitting senders.

A central monitor in accordance with the invention includes a memory for storing a repertoire of sender ID codes. This repertoire can be stored or acquired in several different ways; e.g., the ID codes can be 1) preprogrammed into nonvolatile memory at the factory, 2) uploaded from a host processor, 3) programmed into monitor memory via a manual agent such as a keypad or switches, 4) learned by the monitor during an installation or set-up procedure, 5) learned by direct electrical contact or by an auxiliary channel such as an infrared (IR) light emitting diode (LED), 6) learned by repeated recognition. Regardless of how the ID code repertoire is acquired, the monitor operates to compare each ID code stored in its repertoire against a received composite signal history accumulated by the monitor. More particularly, the monitor includes a memory which preferably accumulates a history of the composite signal pulse pattern over a time equivalent of at least the longest ID frame. The history is updated at a rate to reflect the received pulses and intermediate interval durations. Each time a new pulse is received, the monitor is able to compare the stored ID codes with the history to identify a match.

In certain applications of the invention, e.g., a man-overboard system, each sender is expected to "check-in" within a certain "time-out"period, e.g., every three seconds. If a sender's ID code fails to appear in the received composite signal within the time-out period, then the monitor generates an alarm. In systems intended for other applications, the monitor can respond more quickly or more slowly or can merely maintain a log of the presence or absence of a sender. In still other systems, the monitor operates to report sender check-ins to a host computer.

In accordance with a first exemplary embodiment (serial code burst) of the invention, each sender transmits a coded burst of pulses during each frame active interval. Each pulse burst defines an ID code uniquely identifying the sender. The bursts are spaced by quiet intervals whose durations are preferably pseudorandomly selected. Thus each sender will transmit its bursts based on a different sequence of quiet interval durations so that successive burst collisions are highly improbable.

In accordance with a second exemplary embodiment (code burst/pulse) of the invention, a coded pulse burst defining a sender's ID code is transmitted once per frame and marker pulses are additionally transmitted during each frame to bound the quiet intervals. In this embodiment, the sequence of quiet interval durations can redundantly identify the transmitting sender.

In a third exemplary embodiment (pulse only) of the invention, the ID code of each sender is defined by a unique sequence of quiet interval durations between marker pulses transmitted during each frame. The monitor includes a storage means storing a repertoire of sender ID codes, i.e., a set of interval durations for each sender. Additionally, the monitor includes a memory, e.g., a shift register, which maintains a history of recently received composite signal pulses. Each time a new pulse is received, the monitor compares the pulse pattern of each stored sender ID code against the pulse history looking for a match. When a match is recognized, the associated sender is confirmed as having "checked-in" and a free running timer associated with that sender is reset. As long as the timer is reset before it counts to a threshold timeout value, the sender is deemed to be continuously present.

In a fourth exemplary embodiment (pulse/group synch) of the invention, the pulse pattern of the third embodiment is supplemented by a group synch (GS) pulse pattern common to all of the senders. Thus, the GS pattern defines the set of members and enables monitor to more rapidly identify the sender ID codes within the composite signal received from all senders.

In a fifth exemplary embodiment (group synch/symbol) of the invention, the fourth embodiment ID code pulse pattern is subdivided into multiple sub-codes. In this embodiment, each sub-code is able to communicate a different symbol to the monitor. Symbols, for example, might be numbers. That is, each symbol could be used to represent a number from 0 to 99. With an ID pattern defining three such symbols, the monitor can discern 1,000,000 possible unique sender-identifying ID codes. This embodiment finds service in applications where the population of the member set is large but relatively few members are present at any given time. An example of such an application is the monitoring and logging of warehouse items flowing down a conveyor belt for shipment.

Several variants of the aforementioned embodiments are also described hereinafter. For example, a correlation processing capability can be advantageously introduced into the several embodiments. This capability involves the process of correlating a received data stream with pulse patterns associated with known sender ID codes. The known sender ID codes are stored as binary patterns in the monitor's repertoire memory. The received data stream originates as a graded signal, e.g., a radio baseband signal. This graded signal can be converted to digital format and processed arithmetically or the received data stream can be first processed by a thresholding element so that the data is converted to a binary pulse train format. In either case, correlation processing involves comparing two signals and computing a correlation score. The resulting scores are compared to discriminate threshold in order to make a decision as to the presence or absence of a particular sender. Correlation processing permits enhanced detection of sender pulse patterns when the incoming data is partially corrupted or incomplete.

In another variant, one or more data pulses can be positioned in an ID frame to enable a sender to communicate data, e.g., temperature or flow rate, to the monitor.

BRIEF DESCRIPTION OF THE DRAWINGS

FIGS. 23A, 23B, 23C1, 23C2, 23C3, 23C4, 23D and 23E schematically depict arrangements for conserving sender battery power;

DETAILED DESCRIPTION

SENDER/MONITOR SYSTEM (FIG.1)

Figure 1:
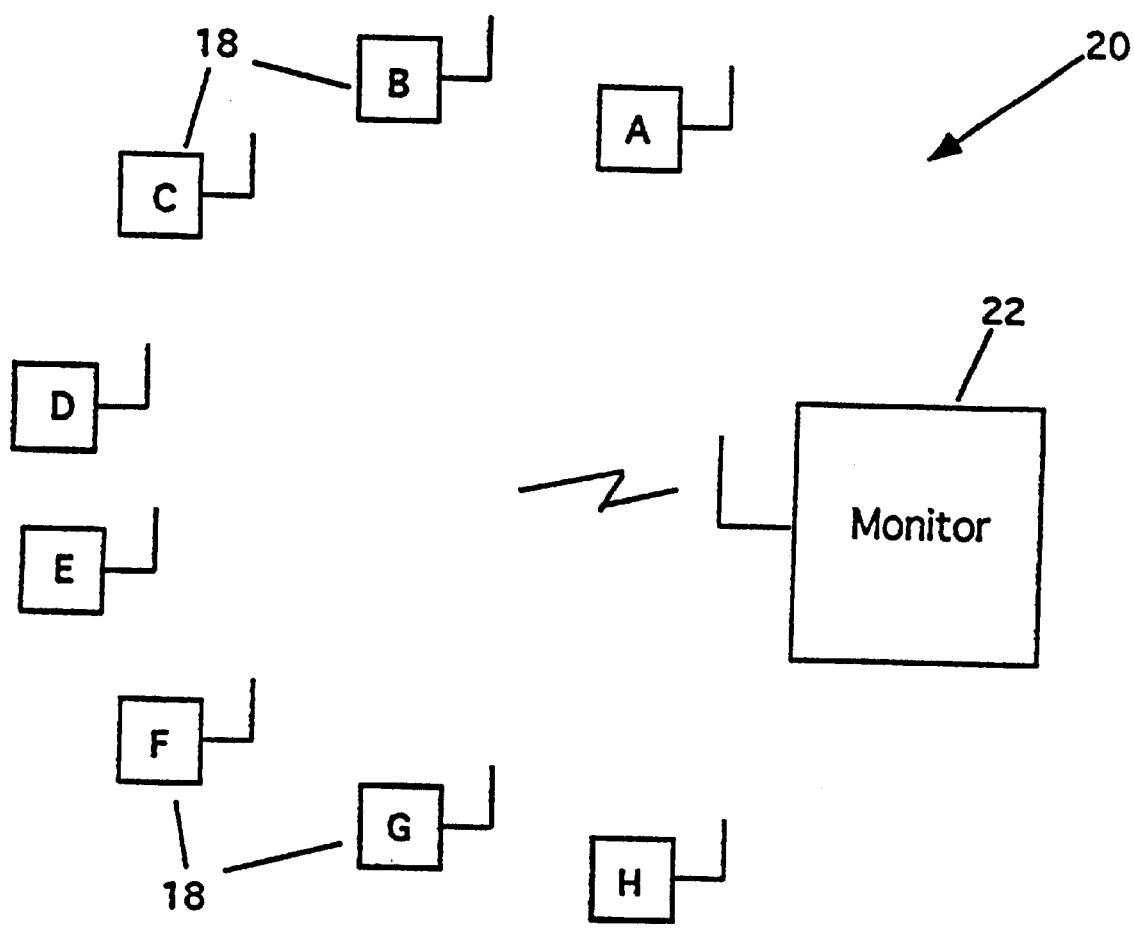
FIG. 1 is a block diagram of a typical system in accordance with the invention including multiple senders A-H and a central monitor.
Figure 2A:
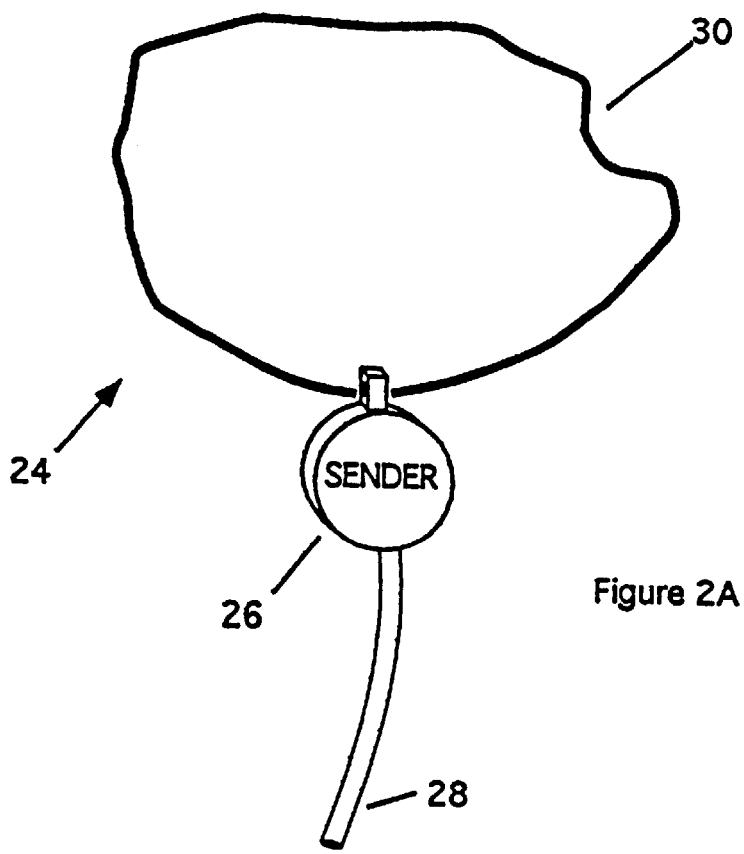
FIG. 2A depicts a typical sender in accordance with the invention intended to be carried by a user via a neck-strap.

Attention is initially directed to FIG. 1 which depicts a typical system 20 in accordance with the invention comprised of multiple senders 18 (respectively labeled, A-H) and a common monitor 22. The system 20 can be used in a wide variety of applications to keep track of the members of a predetermined set of members. For example, the set of members can be all persons on board a boat. Each member carries a different sender, e.g., on a neck-strap, as depicted in FIG. 2A. The function of each sender is to repeatedly transmit an identification (ID) code which uniquely identifies the sender. An ID code in accordance with the invention is preferably represented by a pulse pattern contained in an identification frame transmitted during each sender cycle.

Systems in accordance with the invention can accommodate widely different numbers of senders depending on the application. For example, in a typical man-overboard system intended for use with recreational boats, it may be sufficient for the system to accommodate a small number of senders, e.g., twelve. In a system intended to monitor animals to prevent their wandering out of a defined area, it may be appropriate to accommodate one hundred or more senders. In other applications, for example, to monitor children at a school, or elderly persons at a senior home, or inmates at a prison, it may be appropriate to accommodate several hundred senders. In other applications, for example, a rail freight yard, a system in accordance with the invention can operate in conjunction with a host computer to monitor and log individual box cars as they enter a yard. The number of box cars actually logged may be limited but the population of different box cars capable of being distinguished and individually logged could be very large, e.g., many thousands.

Figure 2B:
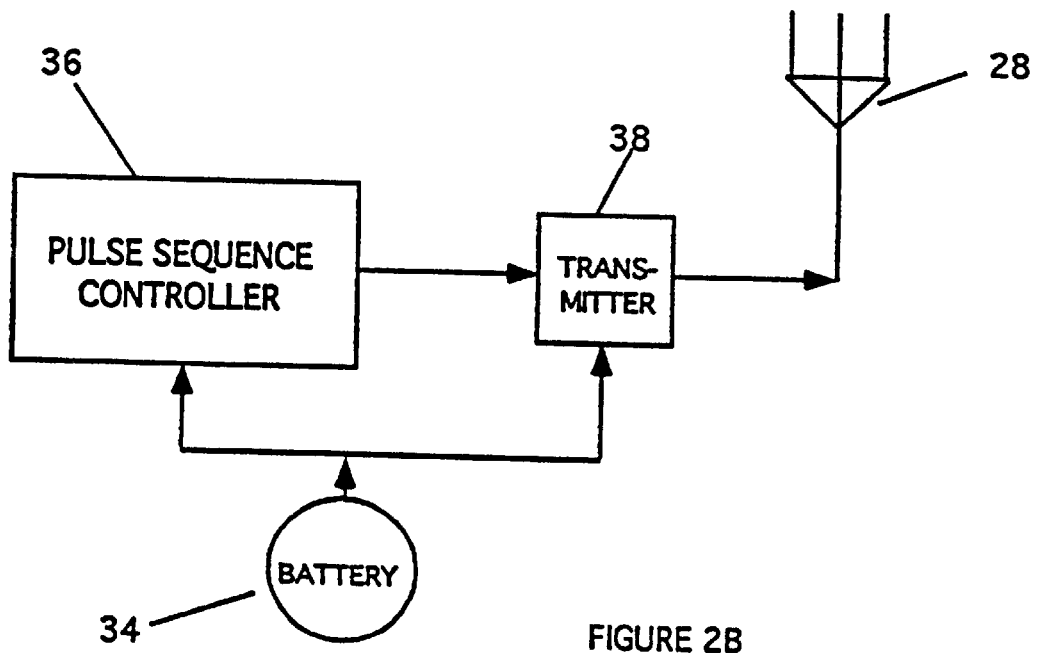
FIG. 2B is a functional block diagram of a typical sender in accordance with the present invention.

FIG. 2A depicts a typical sender 24 comprising a housing 26 having a flexible antenna 28 and carried by a neck-strap 30 intended to be worn by a member to be monitored. FIG. 2B depicts a functional block diagram of electronic circuitry within housing 26 and connected to antenna 28. The circuitry includes a battery 34 for powering a controller 36 and a transmitter 38. The controller 36 functions to amplitude control (e.g., on-off) a carrier signal generated by transmitter 38 to produce a pulse pattern defined by a unique ID code stored in the controller. Although it is primarily contemplated that the carrier signal comprise an RF signal, it is important to recognize that the invention can also be implemented using other communication mediums such as a common wire connecting all senders to the monitor, ultrasound, infrared, etc. It is also pointed out that the controller 36 can be implemented in various ways such as a programmed microprocessor, state machine, hardwired logic, etc.

CODE BURST EMBODIMENT (FIG. 3)

Figure 3:
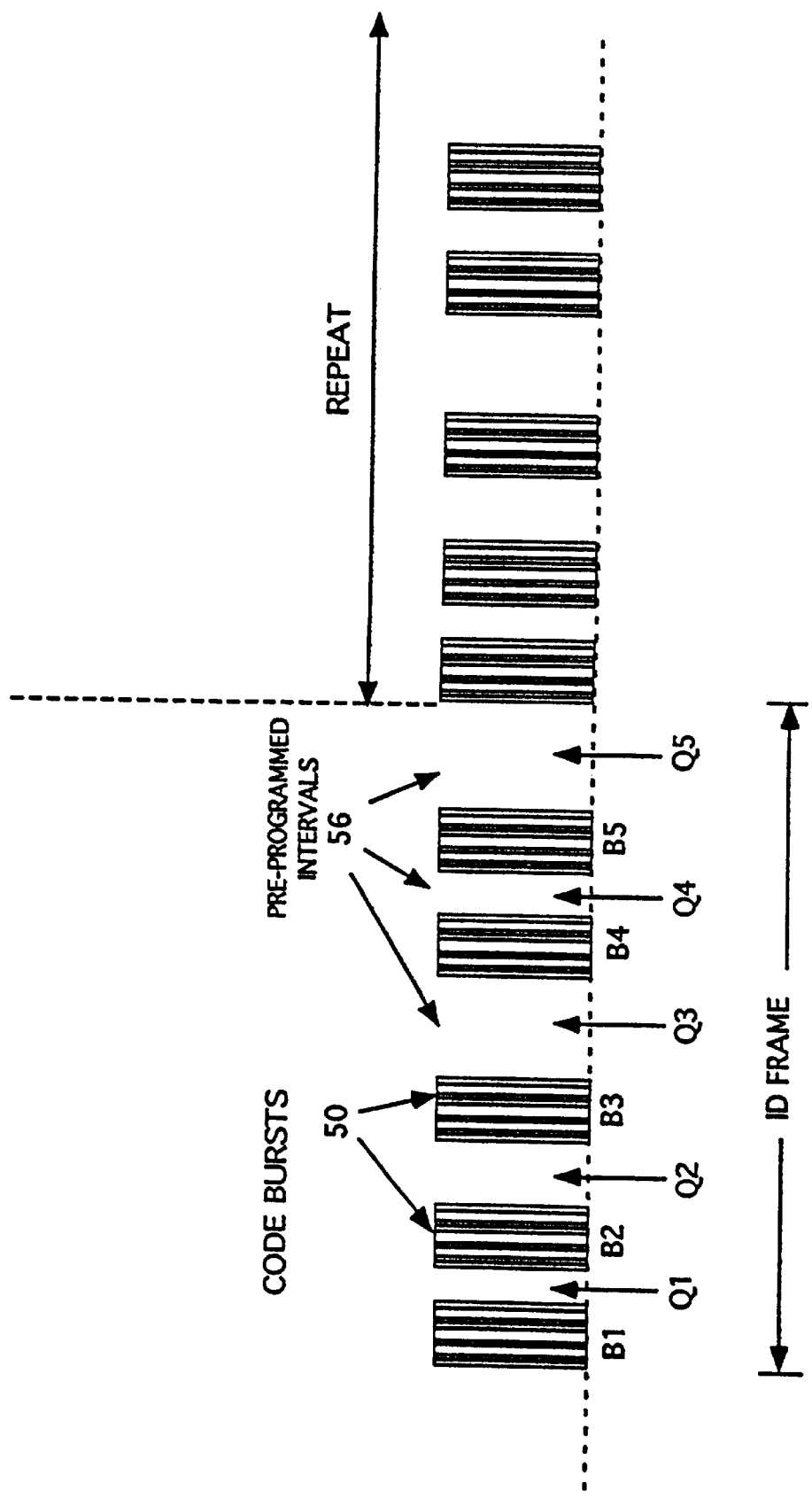
FIG. 3 is a timing diagram in accordance with the first (serial code burst) embodiment of the invention showing within each frame multiple code bursts and a sequence of quiet intervals.

Attention is now directed to FIG. 3 which depicts an exemplary identification frame transmitted by a sender 24 in accordance with the first (serial code burst) embodiment. In this embodiment, an identification frame is depicted as being comprised of active intervals B1, B2, B3, B4, B5, each containing a pulse burst 50, spaced by quiet intervals Q1, Q2, Q3, Q4, Q5.

In the embodiment of FIG. 3, each sender transmits identical coded pulse bursts 50 of On/Off-Keyed pulses which define a binary ID code. A burst can, for example, consist of ten pulse intervals which would yield a pool of 1024 unique ID codes. The duration of each pulse burst 50 is preferably short relative to the duration of a quiet interval 56 between bursts. Thus, quiet intervals 56 in FIG. 3 preferably have a duration considerably greater than ten pulse intervals.

More particularly, each code burst 50 in FIG. 3 is comprised of a series of pulse intervals, each pulse interval accommodating a single code bit. The presence or absence of a transmitted signal during a pulse interval determines the binary state of the code bit. The ID code develops serially in time so it is vulnerable to interfering signals from other senders throughout the burst 50. The embodiment of FIG. 3 is configured to reduce the prospect of such interference (collisions) among senders' signals and to mitigate their effect when they rarely occur.

In the embodiment of FIG. 3, successive code bursts from a sender are spaced by irregular but preset quiet intervals depicted as Q1, Q2, Q3, Q4, and Q5. In practice, the quiet interval duration is much longer than the active interval duration. The duration of each quiet interval is internally programmed at the sender's controller 36, as is the sender's ID code manifested in burst 50. The respective durations of the quiet intervals are preferably pseudorandomly determined. Each sender has a unique serial ID code assigned to it as well as a unique set of quiet interval durations. The identification frame duration need not be the same at each sender but it is important that no two senders have the same sequence of quiet interval durations or the same ID code.

In the embodiment of FIG. 3, when multiple senders are participating, a first collision will occur with a mathematically predictable probability at a rate dependent on system pulse density which is effected primarily by the number of senders present, the duration of the sender's code burst, and the range of quiet interval durations between bursts. The probable incidence of collision can be readily calculated but, in general, fewer senders and shorter code bursts result in fewer collisions. Note, however, that the probability of sequential collisions between any particular pair of sender signals is very much reduced since the quiet interval following the first collision is different for each of the collision participants.

In a practical system for absence detection, a low probability of false "alarm" is obtained by programming the monitor 22 to allow multiple cycles of missing signal check-in before making a decision that a sender is absent. While a pulse collision could indeed occur during one cycle resulting in a missed sender check-in, the probability of a given sender's signal participating in a second collision in the succeeding cycle is much reduced. Likewise, it is even more reduced in a third cycle, etc.

Figure 4:
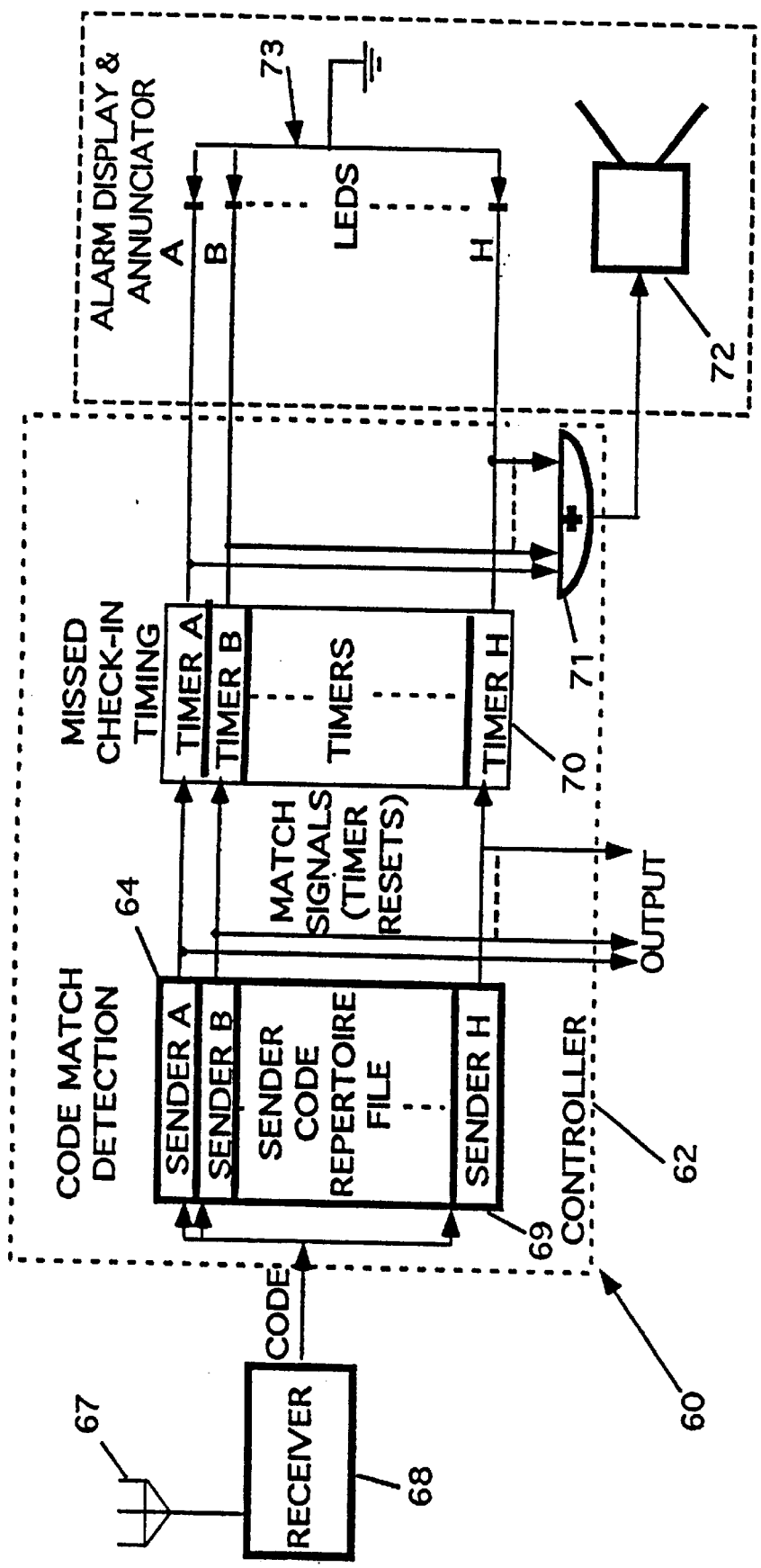
FIG. 4 is a block diagram depicting a monitor useful with the first embodiment of FIG. 3 for decoding and responding to transmissions from multiple senders.

FIG. 4 depicts an exemplary monitor 60 for use with the serial code burst embodiment of FIG. 3. The monitor 60 includes a controller 62 which includes a "code match detection" module 64. Code bursts are received from antenna 67 by receiver 68, which will be assumed to include a thresholding function so that it delivers a binary output. Module 64 functions to locate the matching sender code pattern A-H from its repertoire stored in file 69 to identify the transmitting sender. The match signal outputs from module 94 are, for example, supplied to a host computer and/or used to reset the appropriate free running timer A-H contained in timer module 70. The timer outputs from module 70 are coupled through OR gate 71 to an audible signal 72 which is actuated whenever one of the timers 70 times out before being reset. The time out can alternatively actuate a visible display or provide data to a host computer.

Figure 5:
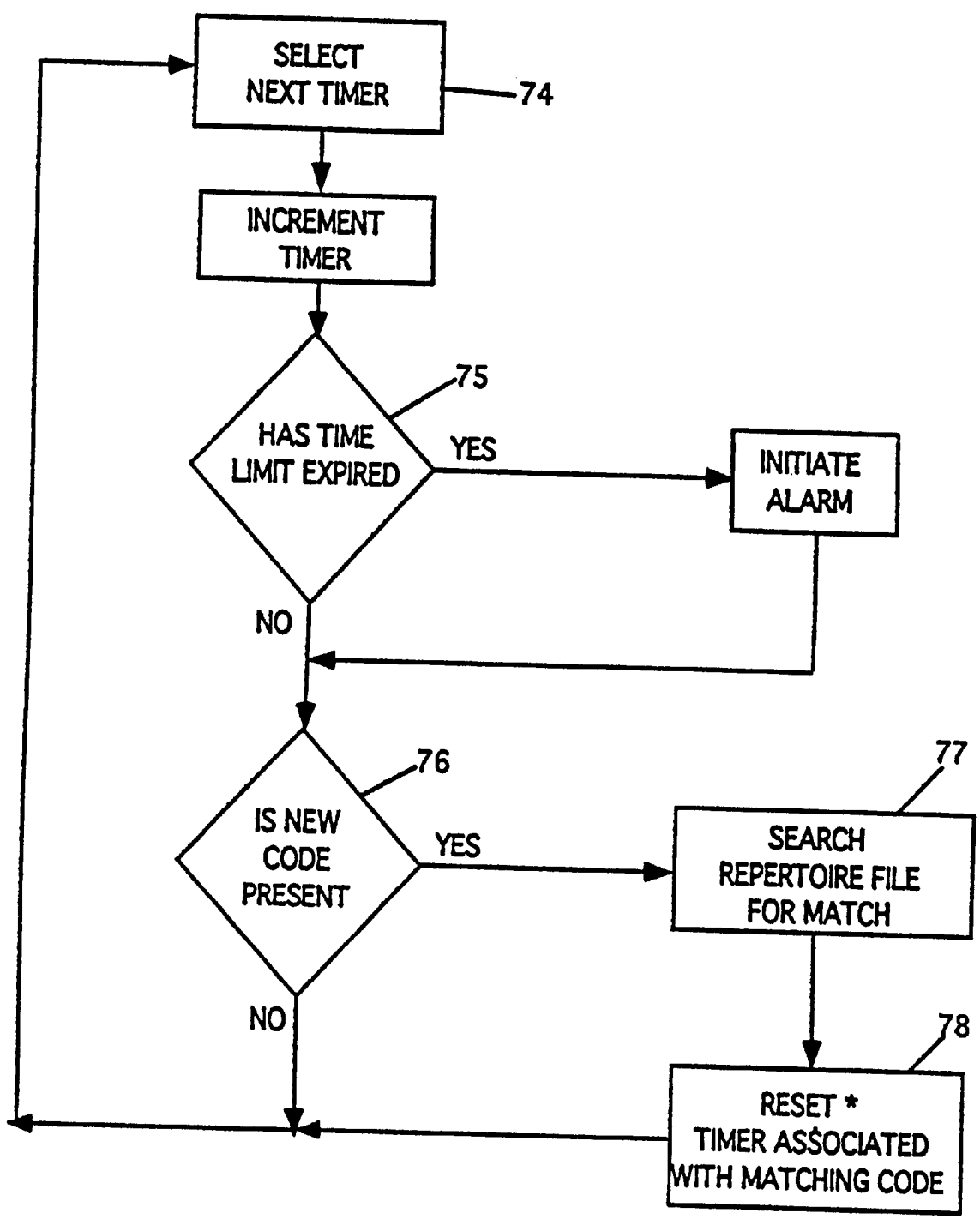
FIG. 5 is a flow chart depicting an operational sequence for the monitor of FIG. 4.

FIG. 5 depicts the operational flow of the monitor 60 enabling it to process the sender signals and control the timers of module 70. More particularly, in block 74, timer module 70 selects a next timer A-H and increments its time count. Decision block 75 determines whether the selected a timer has timed-out. If yes, then an alarm (either audible alarm 72 or LED alarm 73) is initiated. If no, operation proceeds to decision block 76 to determine whether a new sender code burst has arrived. If yes, module 64 searches repertoire file 69 (block 77) and the corresponding module 70 timer is reset in block 78. Operation then loops back to block 74.

CODE BURST/PULSE EMBODIMENT (FIG. 6)

Figure 6:
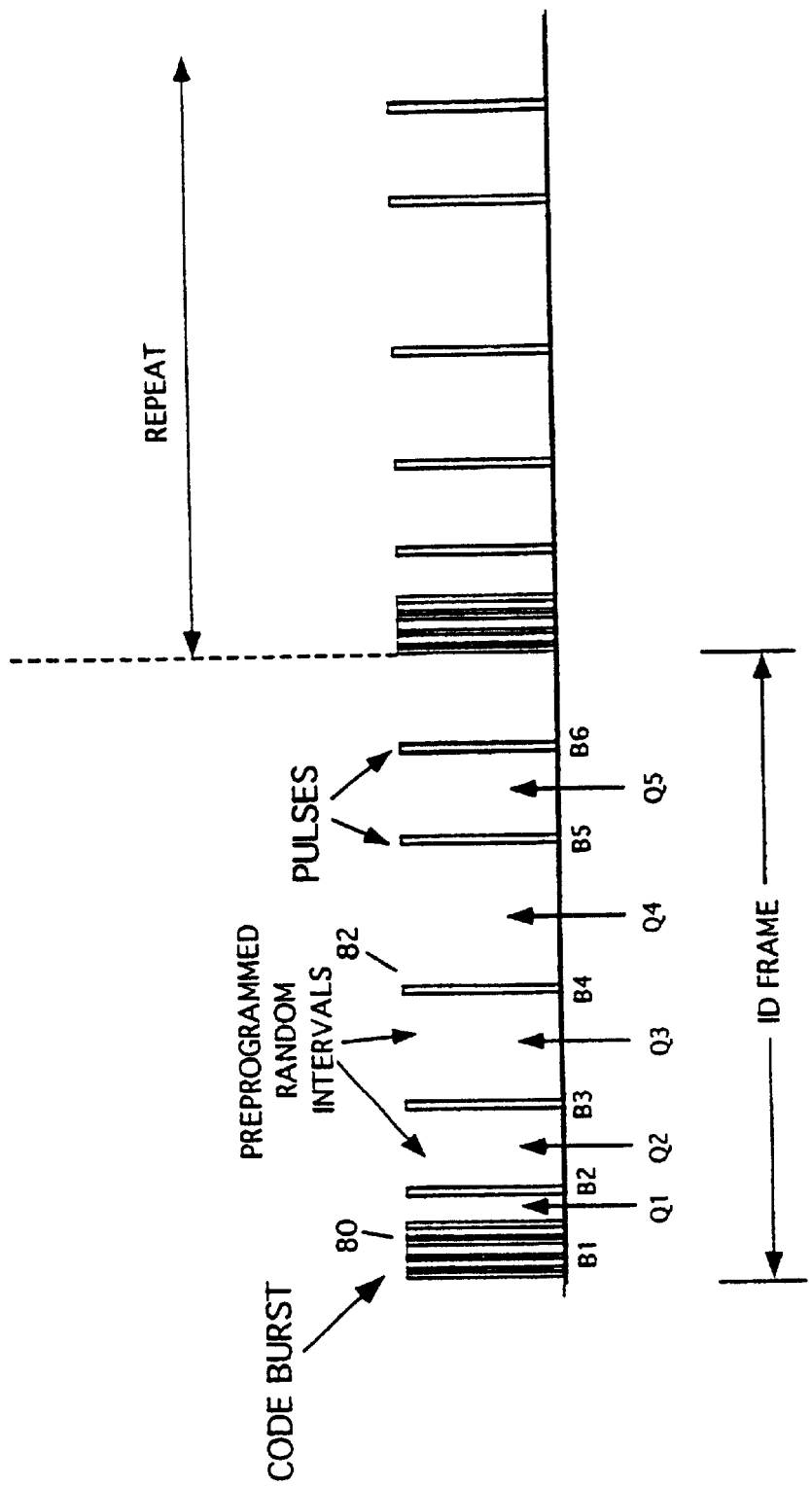
FIG. 6 is a timing diagram in accordance with the second (code burst/pulse) embodiment of the invention showing within each frame a single code burst and multiple marker pulses to define a sequence of quiet intervals.

Attention is now directed to FIG. 6 which depicts the second (code burst/pulse) embodiment. In this embodiment, the frame is comprised of active intervals, e.g., B1, B2, B3, B4, B5, B6 and quiet intervals Q1, Q2, Q3, Q4, Q5. One active interval, e.g., B1, accommodates a pulse burst 80 defining an ID code. Each of the other active intervals, i.e., B2–B6 accommodates a single pulse which functions as a marker to bound a quiet interval. The quiet interval durations are preferably pseudorandomly selected and each, for example, has a width between 1 and 64 pulse widths. Each sender has a unique ID code represented by burst 80 and a unique sequence of quiet interval durations Q1–Q5.

Figure 7:
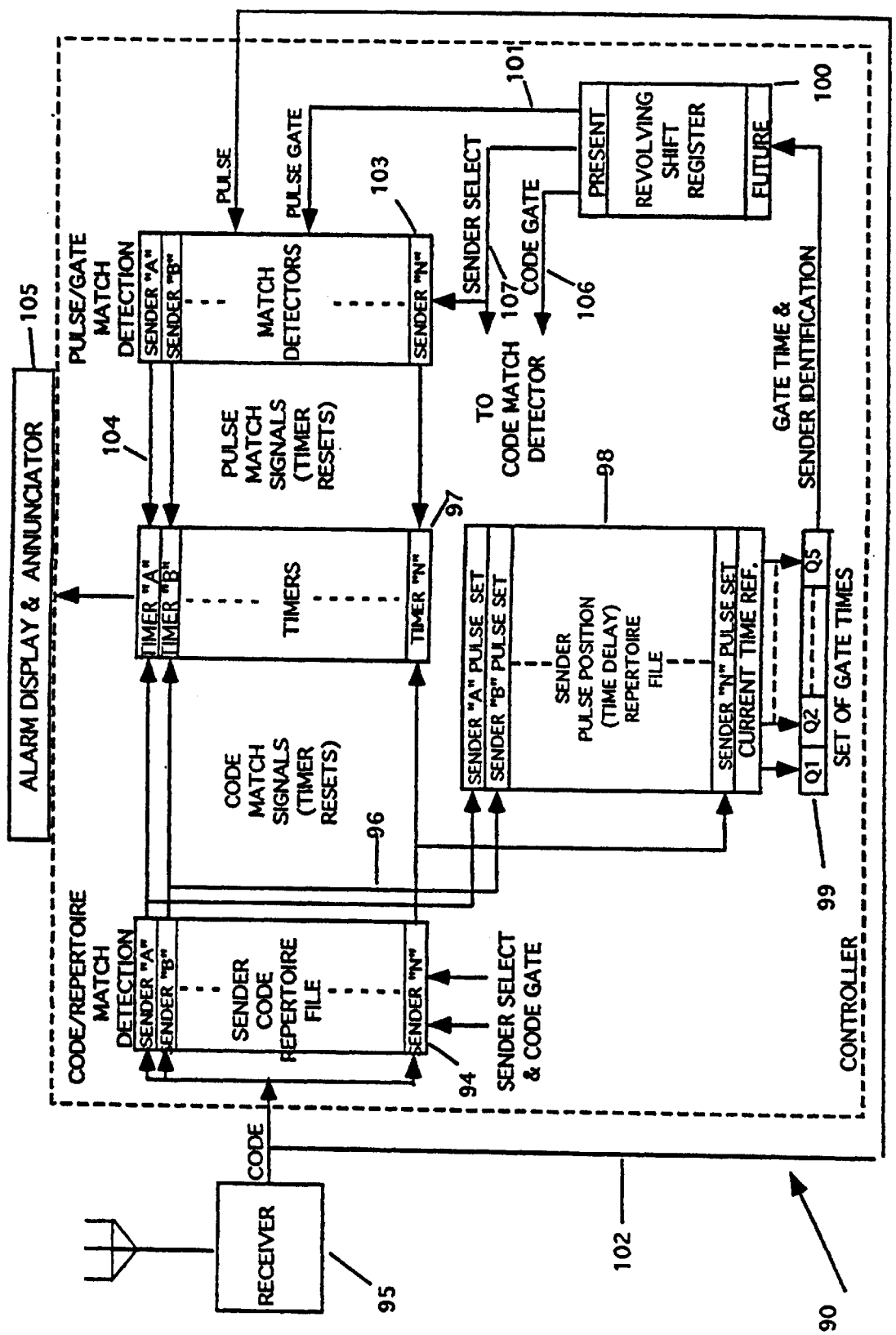
FIG. 7 is a block diagram depicting a monitor useful with the second embodiment of FIG. 6 for decoding and responding to transmissions from multiple senders.

FIG. 7 depicts monitor 90 for use with senders transmitting frames using the code burst/pulse format shown in FIG. 6. Monitor 90 includes a match detection module 94 which stores a repertoire of ID codes for senders active in the system and compares each code burst 90 from receiver 95 with the repertoire of stored ID codes. When a stored ID code matches a received code burst, module 94 produces a code match signal on an associated output line 96. The code match signal performs two significant functions; (1) it resets an associated timeout timer in module 97 and (2) it accesses an associated pulse position data module 98. Module 98 contains a separate register for each sender which represents of the quiet interval durations unique to that sender. The duration of a quiet interval, e.g., Q3, indicates the position (or time) that the next pulse, e.g., B5, should be received from receiver 95.

More particularly, when a code match signal occurs on an output line 96, it functions to transfer a set of pulse times (or quiet interval durations) into output register 99 along with information identifying the associated sender. These pulse times are then used to gate the output of receiver 95 to reset the associated timer in module 97 if a pulse is received at the appropriate time. Note that the quiet interval durations Q1, Q2, . . . are transferred from register 99 into revolving shift register 100 which delivers a "pulse gate" signal on line 101 coincident with the expected pulses at times B3, B1, . . . . The data transferred from register 99 includes sender identification data as well as gate time data.

If receiver 95 provides a pulse on line 102 coincident with the gate signal, the match will be recognized by pulse/gate match detection module 103 which will produce a pulse match signal on an associated output line 104. The pulse match signal functions to reset the associated timer in module 97. Each timer module 97 is free running and will time out unless reset by a code match signal on line 96 or a pulse match signal on line 104.

If any of the timers in module 97 time out, the associated sender will be deemed absent and the alarm display 105 will be signaled.

The monitor 90 functions not only to define pulse gate signals and to look for a coincident pulse from receiver 95, but it also functions to produce a code gate signal on line 106 to look for a sender code burst. The code gate signal 106 is produced by the revolving shift register 100 in accordance with the gate times read out of register 99. Shift register 100 also provides sender selection data on line 107 which is used by the code/repertoire match detection module 95 and by the pulse/gate match detection module 103.

Figure 8:
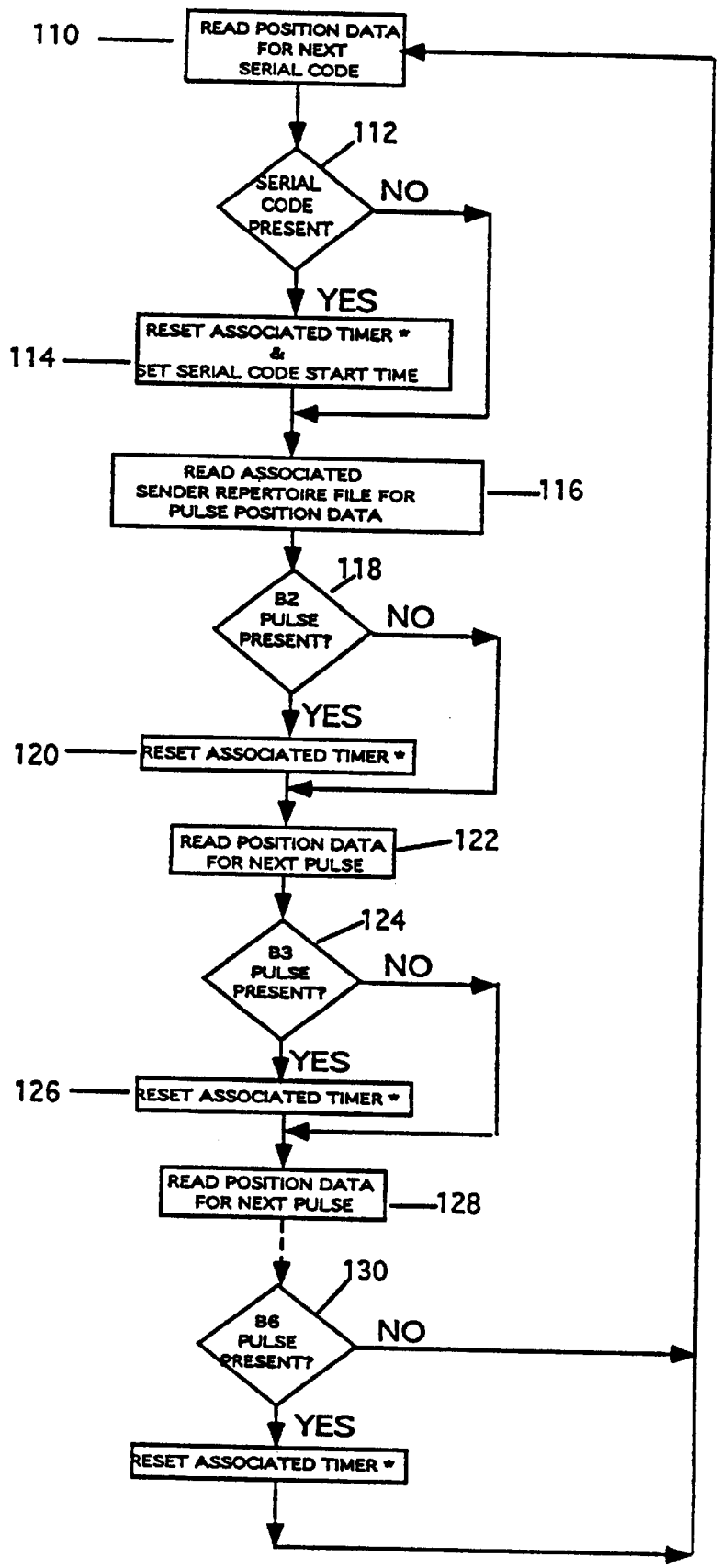
FIG. 8 is a flow chart depicting an operational sequence for the monitor of FIG. 7.

FIG. 8 is a flow chart depicting the operations sequentially executed by monitor 90 in FIG. 7 with respect to a single sender. It should be understood that the same operational sequence shown in FIG. 8 is executed for each sender with the operations being interleaved. FIG. 8 assumes that the monitor 90 has already acquired a particular sender, i.e., recognized its ID code as corresponding to a code stored in its repertoire file in module 94.

Block 110 in FIG. 8 is executed when the code gate signal is produced on line 106 indicating the expectation of a sender serial code burst. Decision block 112 asks if the serial code is present. If yes, block 114 is executed to reset the associated timer in module 97. If the output of decision block 112 is negative or after the execution of block 114, operation proceeds to block 116 which reads the associated pulse position data file from module 98. As previously described, this involves transferring the pulse position data and sender identification to the revolving shift register 100, via output register 99. The shift register then sequentially produces gate signals on pulse gate line 101 coincident with the expected arrival of pulses represented at B2, B3 . . . in FIG. 6. Decision block 118 then ask whether pulse n (i.e., B2) is present on receiver line 102. If yes, the associated timer in module 97 is reset in block 120. If no, or after block 120, shift register 100 is read in block 122 to determine the position of the next expected pulse. Decision block 124 asks if pulse n−1 is (i.e., B3) present. If yes, the associated timer module 97 is reset in block 126. If no, or after the execution of block 126, the next pulse gate signal is developed in block 128. Again decision block 130 asks if receiver 102 provides a pulse coincident with the next pulse gate signal.

Thus as is represented in FIG. 8, the monitor 90 determines at each active interval B1, B2, B3, B4, B5, and B6 of a frame whether or not the sender is checking in. If a sender fails to check in by providing a code burst or pulse when expected, then its associated timer will continue to run. When the timer times out, the alarm display 105 is actuated. Depending upon the application, the system can be configured to disregard a limited number of successive check in failures. For example, in a critical man overboard application, the system might ignore failed check-ins up to a short interval of perhaps three seconds, whereas in other less critical applications this window could be considerably extended.

PULSE ONLY EMBODIMENT (FIG. 9)

Figure 9:
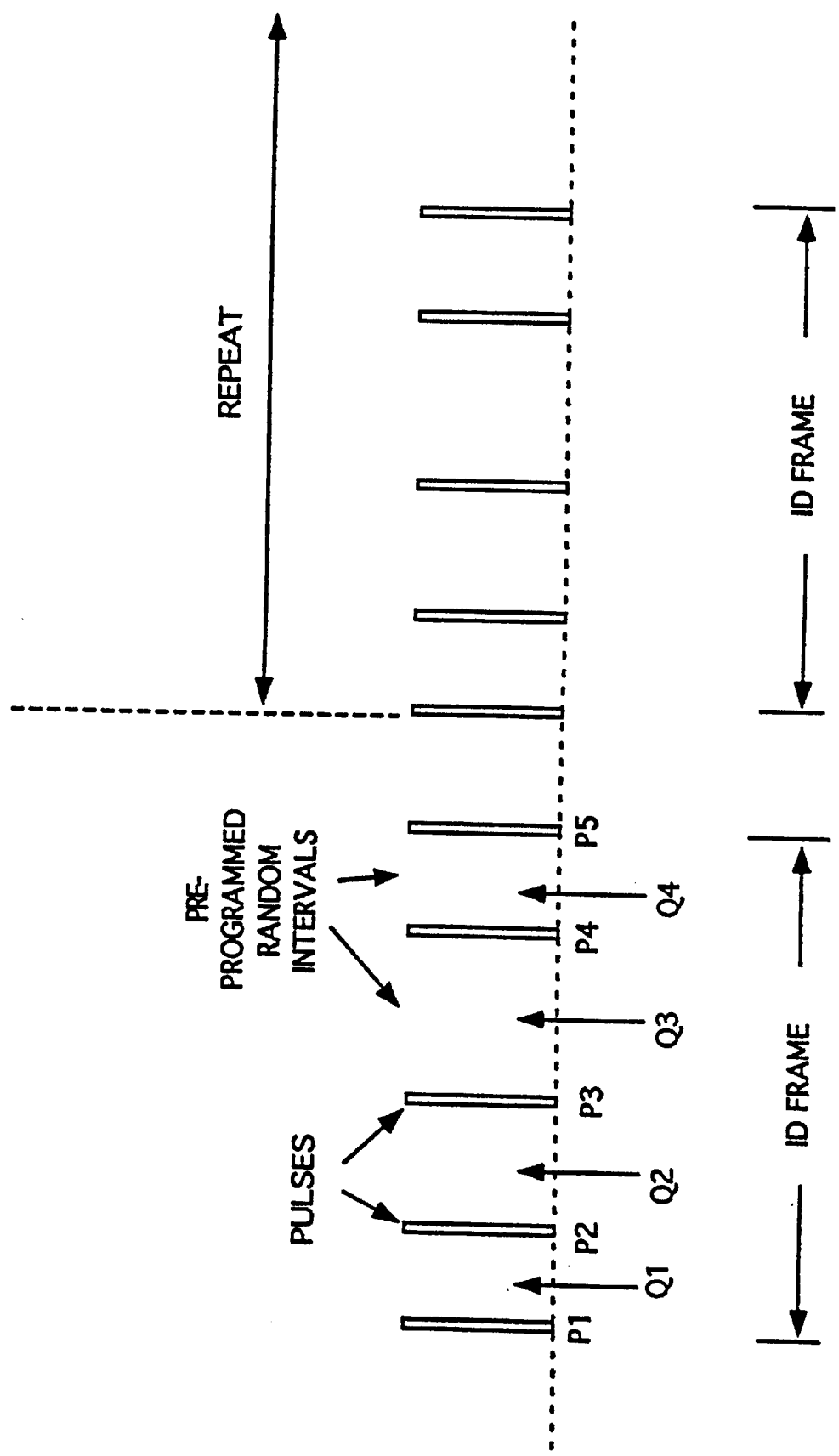
FIG. 9 is a timing diagram in accordance with the third (pulse only) embodiment of the invention showing a frame format including multiple marker pulses defining a sequence of quiet intervals.

Attention is now directed to FIG. 9 which depicts the frame format of a third (pulse only) embodiment. In contrast to the formats of FIGS. 3 and 6, the format of FIG. 9 does not use a coded pulse burst to define an ID code. Rather, a sender's ID code is fully defined by the relative positioning of multiple ID pulses, respectively designated as P1, P2, P3, P4, P5, which mark the boundaries quiet intervals Q1, Q2, Q3, Q4. The ID code can be properly viewed as being fully defined by the sequence of the quiet interval durations or, in other words, by the positions (or time slots) of the ID pulses. The quantitative aspect of the FIG. 9 format can vary considerably based upon the intended system application. However, for clarity, the embodiment of FIG. 9 will be described with reference to certain exemplary parameters including (1) active intervals per frame equal five, each active interval comprising a single pulse interval respectively identified as P1–P5, (2) pulse interval equals 100 microseconds, (3) quiet intervals per frame equal four, each quiet interval having a variable duration between 1 and 64 pulse intervals, i.e., between 100 microseconds and 6.4 milliseconds.

Each sender has a unique sequence of quiet interval durations assigned to it to define its unique ID code. The durations are preferably pseudorandomly determined. With four quiet intervals per ID frame and with each quiet interval having up to 64 different values, a very large number ($64^4$) of different ID codes is available for assignment. Inasmuch as this number is several orders of magnitude greater than the number of typically active senders, judicious code assignments would enable the monitor (FIG. 10) to identify an ID code by examining only a few of the pulse positions P1–P5. However, as will be described in connection with FIG. 10, by examining more pulses than is minimally required to distinguish a sender, redundancy is achieved in the code itself. This pulse redundancy allows senders to be readily distinguished even in an environment of considerable interference from other senders and noise sources.

Figure 10:
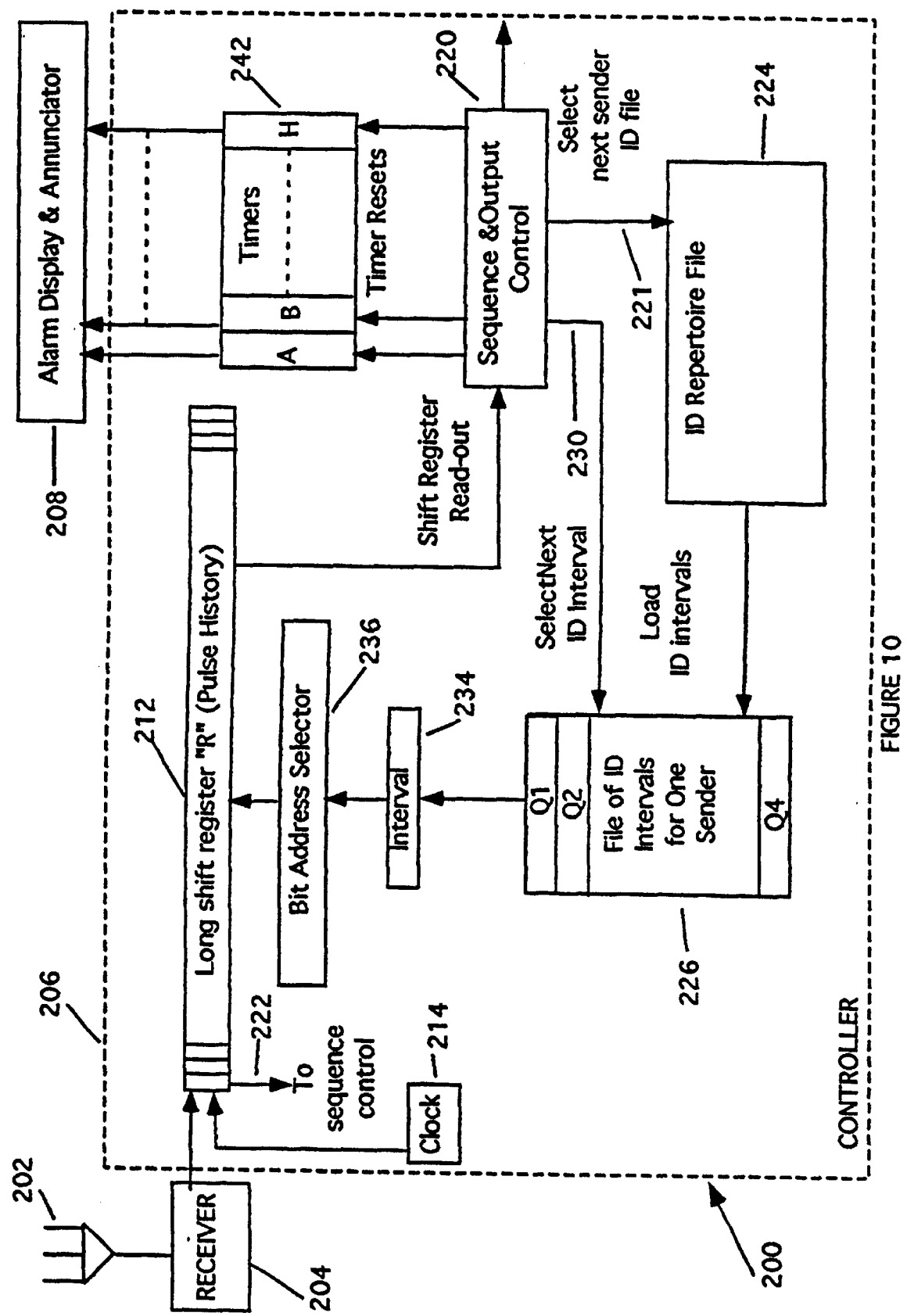
FIG. 10 is a block diagram depicting a monitor useful with the third embodiment of FIG. 9 for decoding and responding to transmissions from multiple senders.

FIG. 10 depicts a monitor 200 for receiving and interpreting a composite signal formed by multiple senders asynchronously transmitting in accordance with the pulse only frame format of FIG. 9. Recall that each sender repeatedly transmits its uniquely coded ID frame with a regular periodicity. FIG. 10 shows a receive antenna 202, a thresholded receiver 204 providing a binary output, a controller 206, and an alarm device 208. The controller functionally defines a long shift register 212 for storing a history of received pulses. The output of receiver 204 is logged into shift register 212 by clock ticks from clock 214. For purpose of explanation, assume that the clock 214 generates a clock tick every 100 microseconds. Each clock tick will enter either a "1" or "0" bit into the shift register 212 depending upon the state of the composite output signal supplied by receiver 204. The shift register 212 is selected to be sufficiently long to maintain a pulse history equal to at least the duration of the longest ID frame. The controller 206 functions to compare its stored repertoire of ID codes (i.e., quiet interval durations/pulse positions) against the pulse history represented by the shift register 212. If a match occurs, it means that the associated sender has checked in and consequently the associated timeout timer has been reset. If a timer's time out period expires because its sender has failed to check in, then the alarm and annunciator 208 is alerted to the change of status.

More particularly, note that the controller 206 includes a sequence control module 220. The sequence module 220 receives a timing signal via line 222 whenever a pulse is entered into the shift register 212. The sequence control module 220 via line 221 sequentially sends ID file from a repertoire stored in repertoire file storage 224. This causes the storage 224 to transfer the selected set of quiet ID interval durations (or pulse positions) to file 226. File 226 stores the pulse times or positions defined by the sequential quiet interval ID. The sequence control module 220, via control line 230, sequentially transfers the quiet interval durations to register 234. The interval duration value in register 234,via address selector 236, addresses a particular bit position in shift register 212 to determine whether it stores a pulse. Shift register readout line 240 indicates whether a match is found. If successive pulse matches are found, as described in FIG. 11, then the control module 220 generates a reset signal to reset the associated sender timer in timer module 242. If ever a sender fails to check in before the expiration of the timer's timeout period, then the alarm 208 is actuated. Alternatively, or additionally, the reset signal can be supplied to a host computer to indicate presence.

Figure 11:
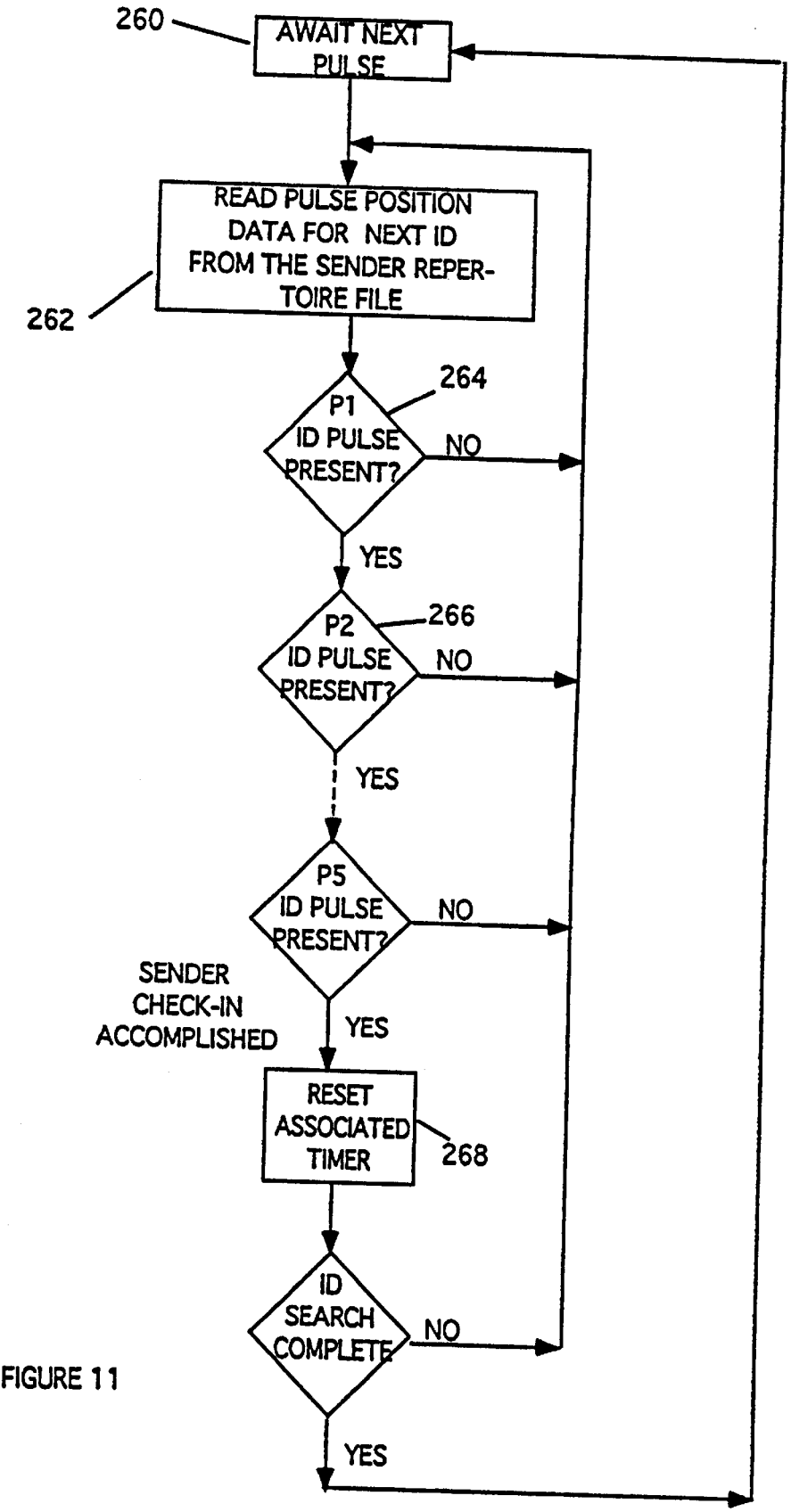
FIG. 11 is a flow chart depicting an operational sequence for the monitor of FIG. 10.

FIG. 11 is a flow chart describing the algorithm executed by. of the monitor 200 for a single sender. Briefly, the algorithm (FIG. 11) proceeds as follows. Upon the arrival of each new pulse, all sender pulse sequences in the monitor's repertoire are compared with the pulse history contained in shift register 212. When the current pulse is determined to be the last pulse in a sender's pulse sequence, that sender's code is recognized as a valid check-in and its associated timer is reset. More particularly, block 260 represents that the sequence control module 220 is awaiting arrival of a next pulse from receiver 204. When the next pulse arrives, the next ID interval (or pulse position) data set is read from the repertoire file storage 224 and transferred to the file 226. The sequence control module 220, via control line 230, then sequentially supplies data representing interval duration to register 234. Each interval duration supplied is used to determine whether the pulse history in register 212 contains a corresponding pulse. Thus, decision block 264 asks if pulse P1 is present. If no, then the search for that set of ID intervals is aborted and operation loops back to examine a next set of ID intervals. On the other hand, if decision block 264 indicates that pulse P1 does exist in register 212, then operation proceeds to decision block 266 which examines register 212 for the presence of pulse P2. Again, if a pulse is not located in register 212 at the P2 position, then the search process is aborted and operation loops back from decision block 266 to block 262. As is represented in FIG. 11, the pulse positions are examined in sequence to determine whether the set of ID intervals loaded from the repertoire file 224 matches a pulse pattern in the register 212. If all of the ID pulses for a sender are matched by pulses in the shift register 212, then the associated timer 242 is reset in block 268. After the search is completed, operation loops back to block 260 to await the next pulse.

It should be apparent that the format of FIG. 9 results in each sender transmitting a rather low density, or low duty cycle, signal. An important result is very low average current drain; thus long battery life is achieved. This low pulse density reduces pulse collision probability and/or permits large numbers of senders to operate concurrently with a common monitor. Transmissions from many different senders can be interspersed in time with no deleterious effect. Multiple pulse patterns can overlap one another in time and still be accurately resolved.

The effects of pulse collisions are significantly mitigated. For example, when two pulses collide, the system inherently interprets both to be present. Pulses are never missed as a result of a collision. By contrast, in the case of serially dependent codes, any collisions that occur are likely to garble the received codes such that neither colliding signal can be correctly identified. In an alternate version, a next pulse algorithm predicts the simultaneous arrival at the monitor of pulses from two senders so that the fact of the collision is disregarded.

In order to match received pulse sequences to the monitor's stored repertoire, it is necessary to synchronize to the pulse sequence of each sender. Synchronization and code detection is implemented as a single process performed by the monitor of FIG. 10 as previously described.

Utilizing the frame format of FIG. 9, even if multiple sender transmissions happen to be synchronized such that the current pulse can be the last pulse of two or more transmitting senders, reliable detection of all such transmitted signals can still be achieved.

The operation of searching the monitor's ID repertoire file is expedited by aborting a search as soon as a pulse which is present in the sender repertoire is found to be absent in the register pulse history. In ususal operation, the received pulse density is low. That means that most sender search events will quickly abort without the need to check the majority of the pulses in the sequence.

Further efficiency is achieved by allowing the sender searching and identification processing to lag elastically with respect to the sampling operation, i.e., logging bits into shift register 212. When the processing requirements are high, the identification operation can fall behind but, then can catch up a short time later. The ability to lag in the detection process requires only that the register 212 be somewhat longer than the actual length of the longest identification frame. The shift register 212 may typically be implemented as a circular-buffer in RAM memory.

Some benefits of the pulse only embodiment of FIGS. 9–11 are the following:

1. The communication link can be sparsely populated with pulses because ID information is efficiently encoded by the quiet time between pulses. Thus collision probability is reduced.
2. Owing to the low density of pulses, it is possible to include large numbers of senders simultaneously transmitting in the field of a single monitor.
3. Pulse collisions, when they occur, are substantially innocuous due to the high degree of redundancy that is incorporated into the sender ID pulse patterns.
4. The sparse, short pulses of the sender output provide a low on/off duty cycle, thus low average current drain from the sender battery.
5. The use of multiple quiet intervals constitutes intrinsic redundancy that enhances detection reliability even when a sender's pulse pattern has multiple collisions with other sender units. Similarly, redundancy in the pattern improves noise tolerance.

PULSE/GROUP SYNCH (GS) EMBODIMENT
(FIG. 12)

Figure 12:
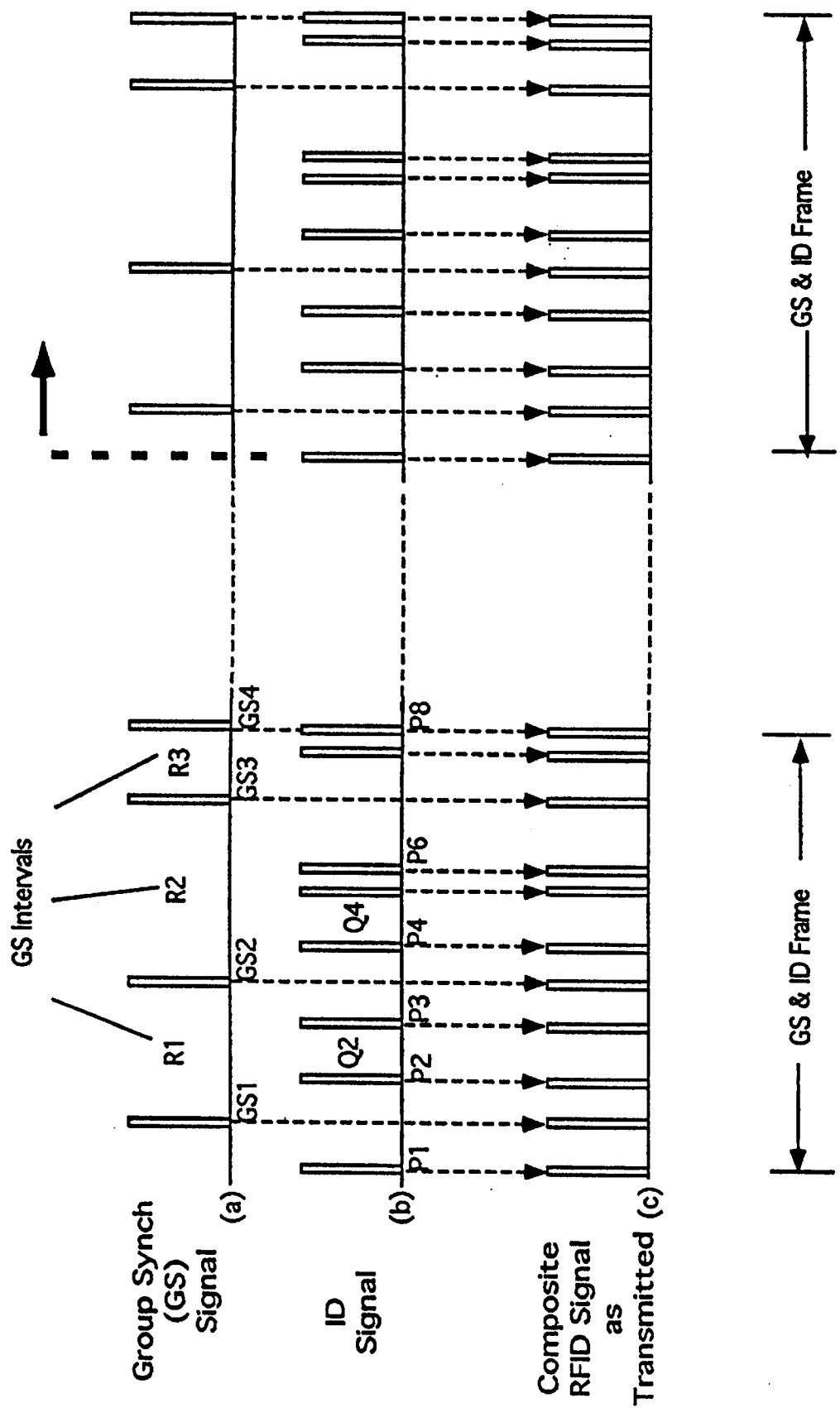
FIG. 12 is a timing diagram in accordance with the fourth (pulse/group synch) embodiment of the invention showing within each frame the marker pulses exemplary of FIG. 9 supplemented by a group synch pulse pattern.

Attention is now directed to FIG. 12 which depicts the frame format of a fourth embodiment (pulse/group synch). This embodiment is similar to the pulse only embodiment of FIGS. 9 in that the ID code is defined by the sequence of quiet interval durations between ID marker pulses (see FIG. 12, line b). However in FIG. 12, the pulse only ID coding is supplemented by a group synch (GS) pulse pattern (FIG. 12, line a.) which also consists of a sequence of pulses which are preferably pseudorandomly spaced. The GS pulse pattern can be interspersed with the sender ID pulse pattern or the GS pattern can be transmitted separately. The GS pulse pattern is common to all senders within a given group. A group is defined as a population of senders sharing some property. In most applications, a single monitor would recognize senders of a single GS code group.

A particular sender's pulse sequence may, for example, consist of four GS pulses (i.e., GS1, GS2, GS3, GS4 defining GS quiet intervals R1, R2, R3) and eight ID pulses (i.e., P1–P8 defining ID quiet intervals Q1–Q7) that are interspersed as illustrated in FIG. 12, line c. Note that the last GS pulse G4 and the eighth ID pulse P8 are preferably coincident.

Figure 13:
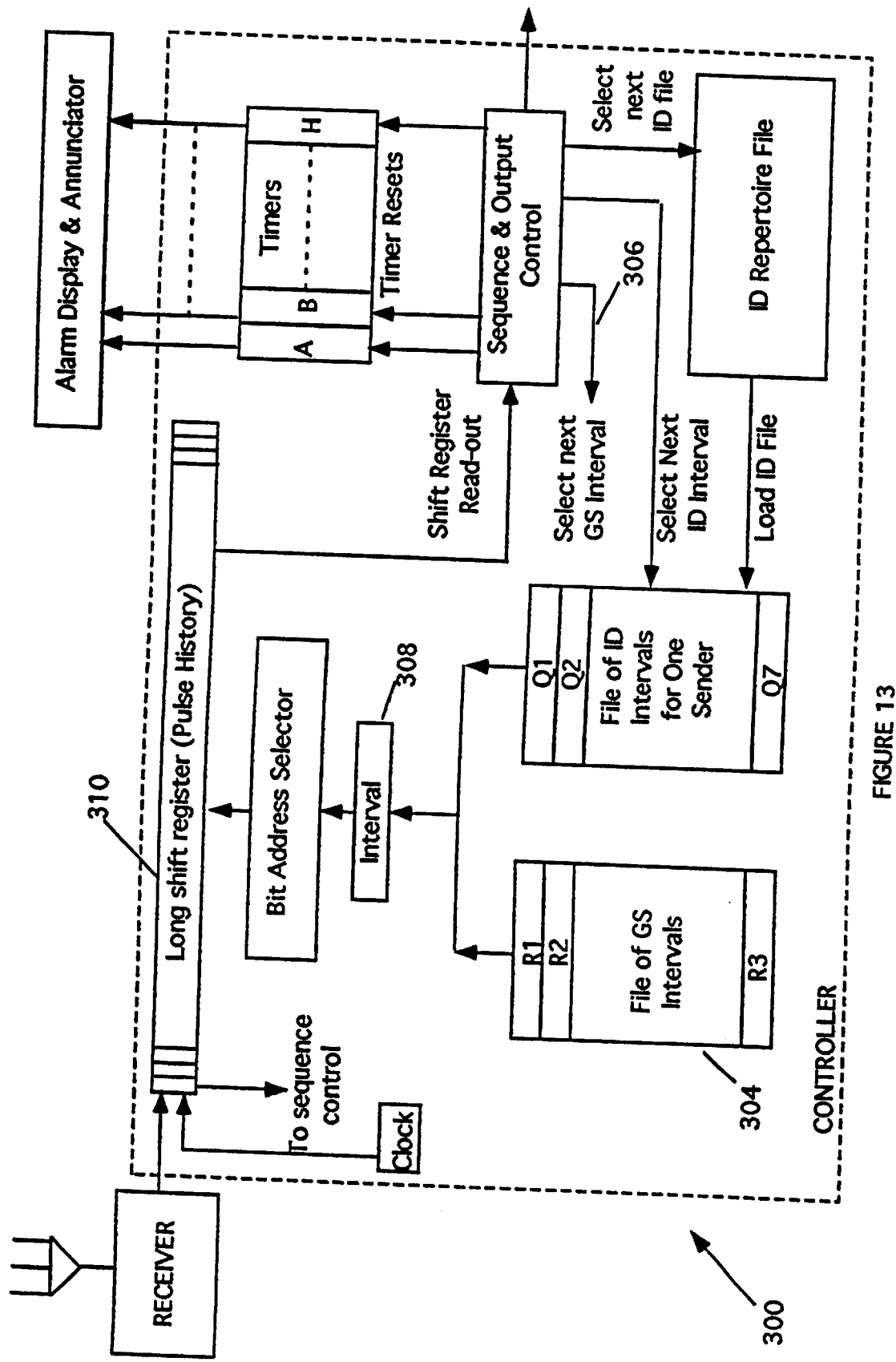
FIG. 13 is a block diagram depicting a monitor useful with the frame format of FIG. 12 for decoding and responding to transmissions from multiple senders.

FIG. 13 depicts a monitor 300 which differs from monitor 200 of FIG. 10 in that it additionally includes file locations 304 for storing interval durations defining the positions of the GS pulses. Additionally, the sequence control module includes a control line 306 which is used to sequentially transfer the GS interval values to interval register 308. As depicted in the flow chart of FIG. 14, the detection algorithm of monitor 300 first searches for the completion of a set of GS pulses. It does this by looking back through the long shift register 310 for a complete GS sequence each time a new pulse is logged into register 310. In other words, the algorithm initially assumes that each new pulse entered into register 310 is the final pulse of a GS sequence and in decision blocks 320, 322, 324, it examines appropriate stages of pulse history register 310 to verify its assumption. Of course, most pulses are not the final pulse of a GS sequence and so the operation can be promptly aborted and there is no need to search the file of sender ID intervals at that pulse time.

However, if a GS sequence is detected, this indicates that a sender ID code is present having a final pulse coincident with the final ID code pulse. So after the GS sequence is recognized in decision block 324, operation proceeds to block 326 which initiates the same ID code search as has been discussed in connection with FIG. 11. Thus, incorporation of the GS pulse sequence insures that ID searching only occurs at synch times when a sender ID code is known to be present. This greatly enhances processing efficiency relative to the previously described embodiments allowing the sender repertoire to be larger. The benefits of the embodiment of FIGS. 12–14 over the prior embodiments include:

1. The GS synchronization mechanism simplifies and accelerates the ID detection algorithm to permit processing larger numbers of senders.
2. The GS signal provides means for group separation so that multiple sender groups can operate simultaneously in the same area without burdening their associated processing algorithms.
3. The GS mechanism enhances a sender's ability to transfer information other than identification information.

More particularly, the use of the group synchronization feature allows the monitor to obtain information from senders in addition to simply identifying them; or even, rather than identifying them. Senders can be configured to transmit a GS signal and also a synchronized coded pulse sequence representing a particular symbol that encapsulates information.

Each symbol has a limited set of values or identities distinguished by a particular pulse pattern. The monitor recognizes the pattern of pulses using GS synchronization and decodes the symbol in much the same manner as it decodes a sender ID code. Pulse patterns of a GS signal, a symbol signal and an ID signal can be synchronized and interspersed in the manner depicted in FIG. 12, line c.

CORRELATION DETECTION

The pulse mode embodiments of FIGS. 9 and 12 preferably incorporate correlation processing techniques in order to ascertain which senders are present or which are absent. There are different modes or levels of correlation processing that may be used. Consider that correlation processing in a most general sense involves comparing two signal patterns. Most generally, the two patterns are both graded signals. In the present application, one of the signals is graded, e.g., a received composite radio baseband signal. The other signal is inherently binary, i.e., the stored ID codes.

Correlation processing generally involves sampling the signals and multiplying the samples of the two signals and accumulating those product elements. When one signal is binary, the multiplication operation degenerates to addition. Specifically, a correlation value can be obtained for each sample time by simply adding the baseband radio sample values at each point where the reference pulse pattern is unity. This correlation sum peaks when the two signal patterns have a high degree of similarity. Peaking of the correlation sum indicates receipt of a sender pulse pattern matching that of a stored binary pulse pattern.

Figure 15:
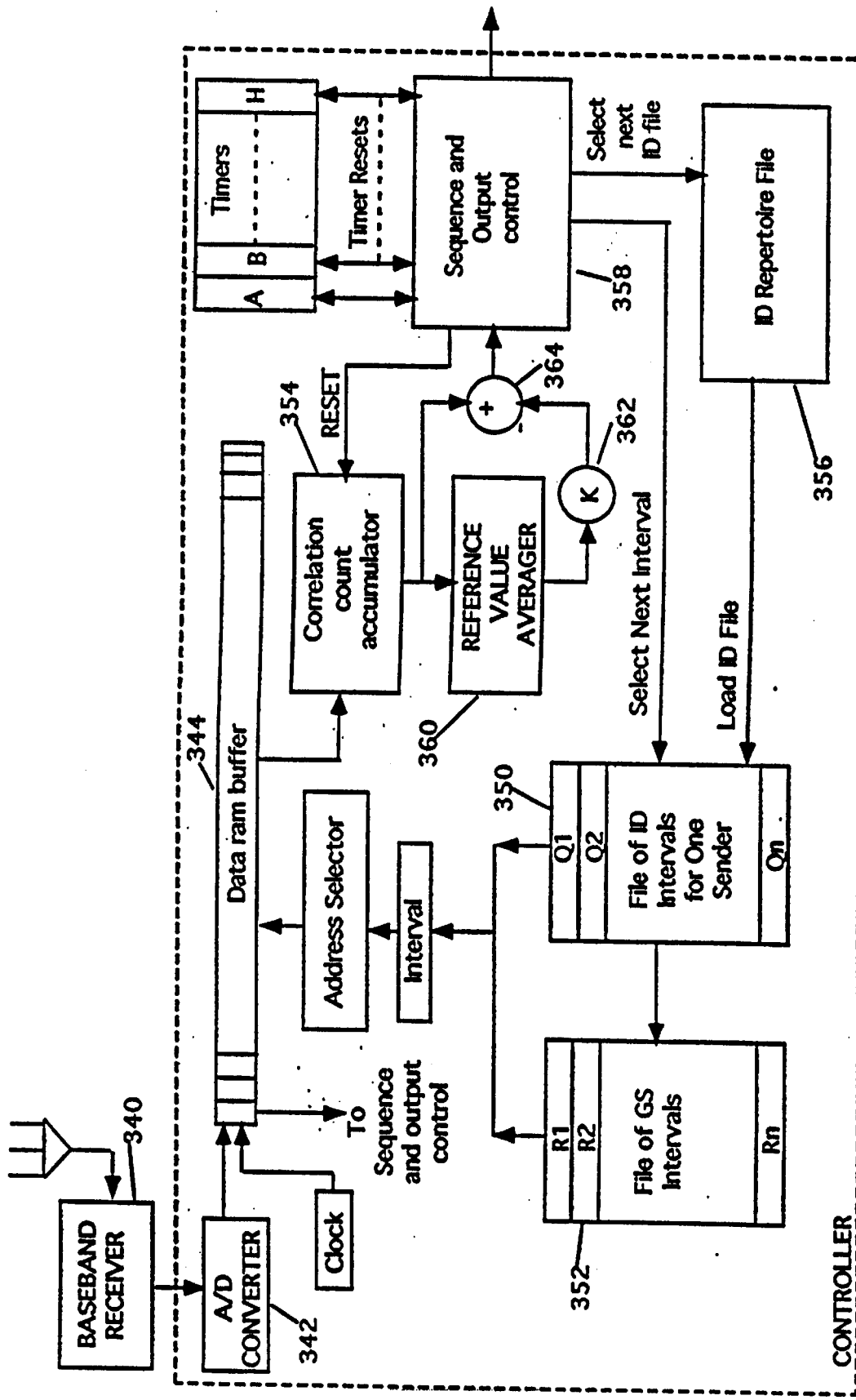
FIGS. 15 and 16 are block diagrams similar to FIG. 13 but modified to include a correlation detection capability.

FIG. 15 illustrates a functional representation of such a correlation process. The analog baseband signal from receiver 340 is converted to a graded digital representation using an analog to digital converter 342. The digital samples produced by converter 342 are successively stored in a shifting data ram buffer 344. The correlation sum is computed by successively accessing this buffer 344 at particular address locations corresponding to the relative position of the ID and GS pulses accessed from files 350, 352 in the manner previous described. At each address, the value stored in the buffer 344 is summed into the correlation count accumulator 354. A net correlation score results after all such additions have been completed for a particular sender ID pattern. A correlation score can thus be determined for each sender ID in the repertoire file 356. Similarly, a correlation score can be determined for the pulse pattern derived from GS file 352.

The presence of a sender is first established when a high correlation score is obtained upon correlation of the buffer 344 with the GS pulse pattern. When the GS pattern is thus located, the sequence control circuit 358 proceeds to present the repertoire of sender ID patterns to the correlation processor 354. One after another, the sender ID patterns are presented for correlation testing. A particular sender is recognized when a high correlation score occurs.

FIG. 15 illustrates one possible method for discriminating correlation scores whereby a reference threshold value or discriminate is determined in real time. In this embodiment, correlation scores are averaged over preceding trials. This averaging function is implemented by a reference value averager 360. The resultant composite correlation score provided by averager 360 is multiplied by a scaling constant which is then used as the discriminate. When a particular sender's correlation score is greater than the discriminate, as determined by summer 364, the sender is recognized as present.

Figure 16:
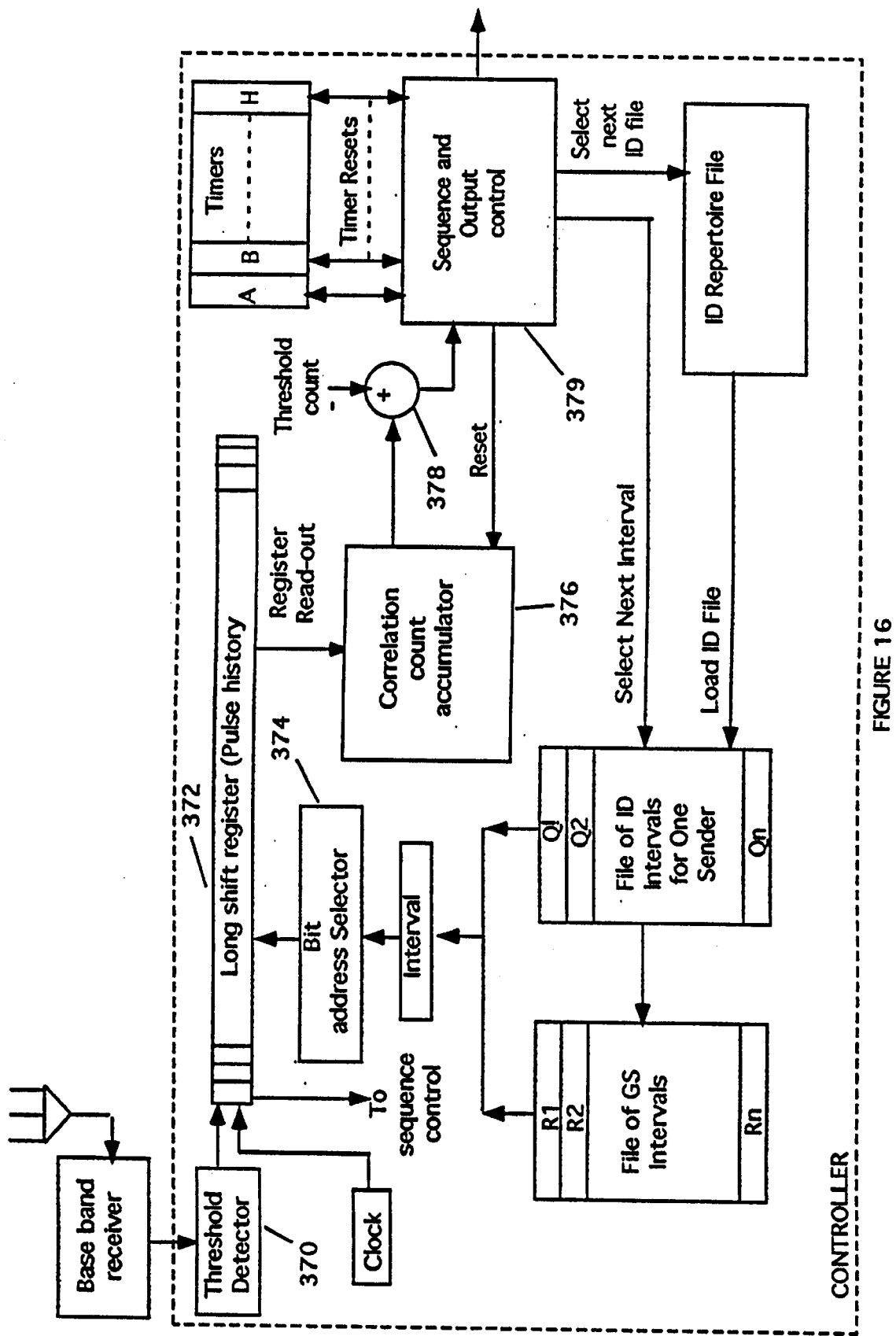

A somewhat simpler embodiment results if the radio baseband data is first converted to a binary stream by means of a thresholding circuit. This is illustrated in FIG. 16 where a thresholding element 370 is shown following the radio receiver. Single bit data samples from the thresholding circuit 370 are stored in a long shift register or data buffer 372.

The bit address selector 374 sequentially selects particular bits from the shift register 372. When a true bit is selected from the shift register, the correlation count accumulator 376 is incremented; if a false bit is selected, the correlation count accumulator is not changed. This process develops over each GS pulse pattern and subsequently over each ID pulse sequence.

The correlation count accumulator output is compared to a threshold count, a preset value, by subtraction in summer 378. If the accumulator output is greater than the threshold count value, then detection is recognized. Before each correlation process, the correlation count accumulator is reset by the sequence and control logic; thereupon, a fresh correlation count can be determined.

One benefit of correlation processing is that it permits accurate detection even if errors exist in the data. For example, when processing the GS intervals, the threshold count value might be set at one or two counts less than the possible maximum number of GS pulses. As a consequence, synchronization can be recognized even when one or two pulses are absent from the comprised signal. Similarly, sender ID detection can also be made tolerant of missing pulses.

GS/SYMBOL EMBODIMENT (FIG. 17)

Figure 17:
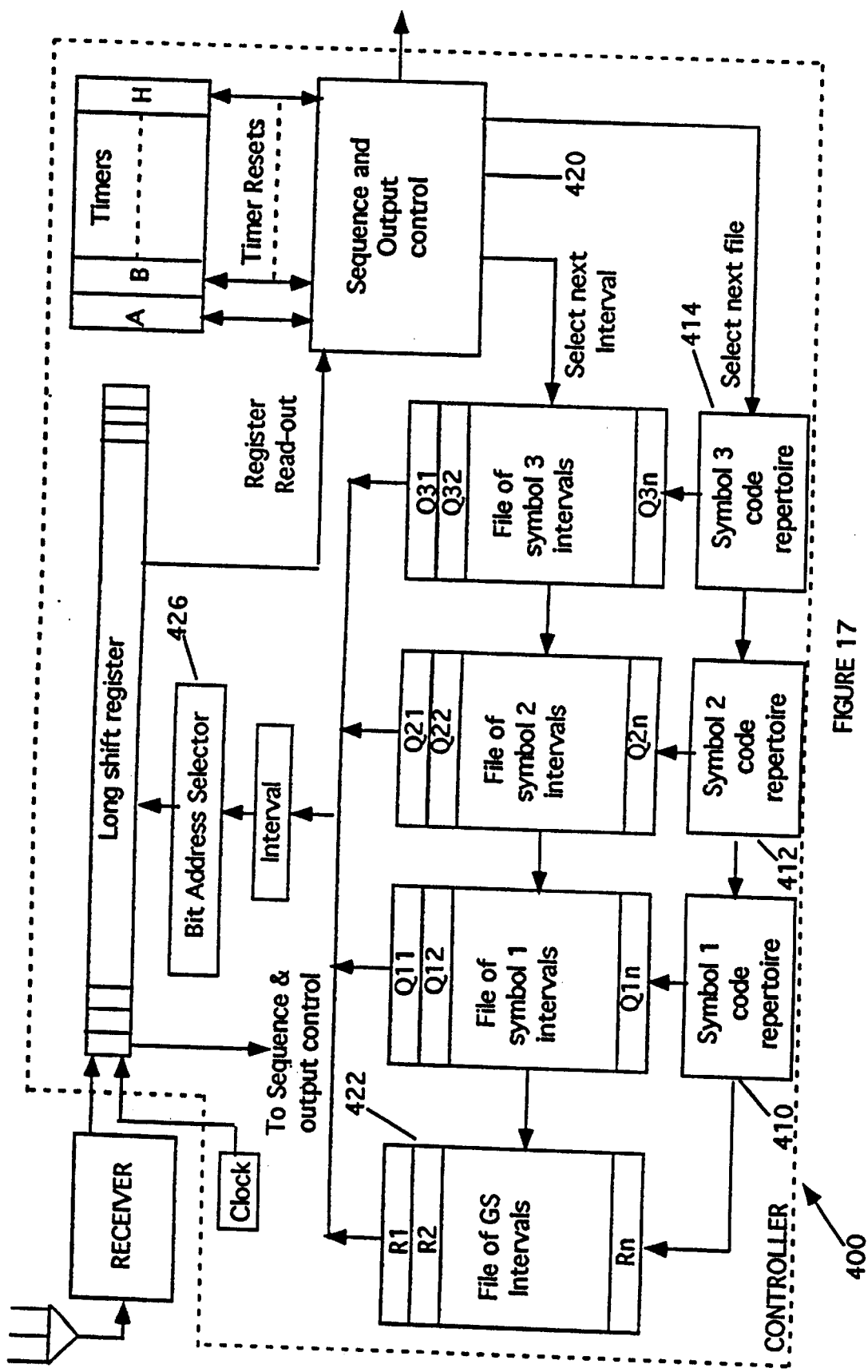
FIG. 17 is a block diagram similar to FIG. 13 but modified to introduce a symbol based detection capability.

Attention is now directed to FIG. 17 which depicts a variation of the Pulse and the Pulse/GS embodiments (FIGS. 9 and 12) previously described. In the embodiment of FIG. 17, each sender's ID code consists of multiple sub-codes. The sub-codes are here called "symbols". Each symbol communicates one element from among a predefined set of elements. Each symbol might, for example, be encoded to represent a number with 100 possible values ranging from 0 to 99. Three such symbols transmitted by each sender would offer the possibility of each sender's communicating up to $100^3$ or 1,000,000 possible unique identity or data items.

Figure 14:
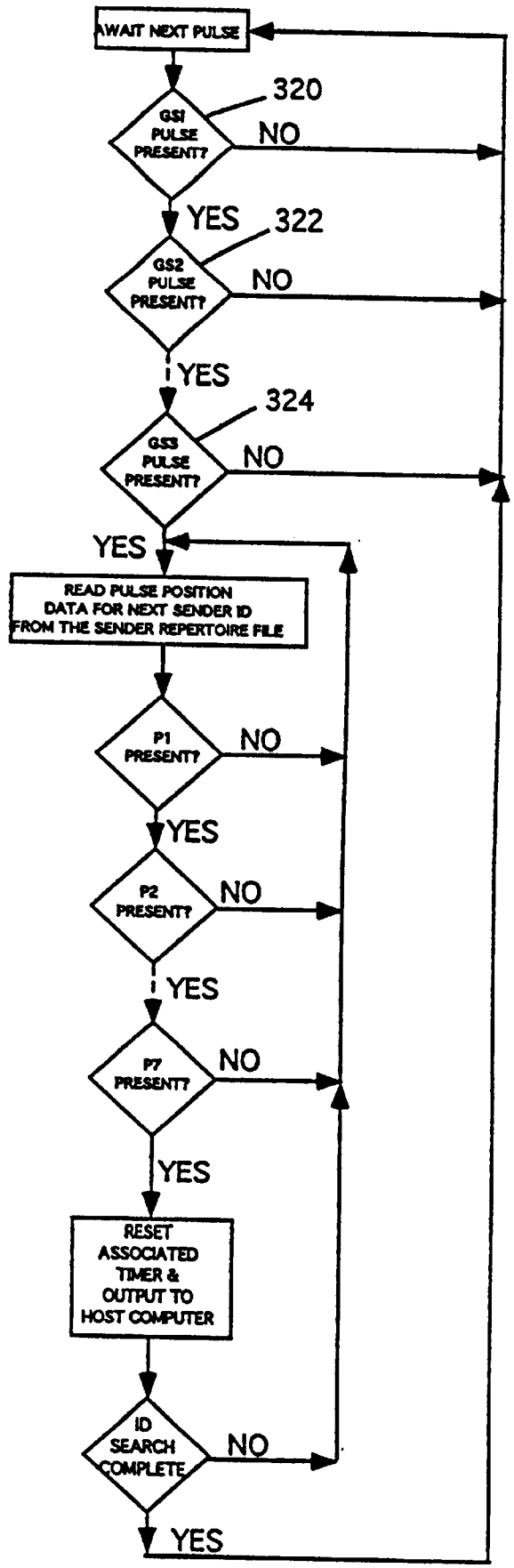
FIG. 14 is a flow chart depicting an operational sequence for the monitor of FIG. 13.

Monitor 400 operates first to recognize a GS pattern in the manner described in connection with FIGS. 12–14. Thereafter, it successively searches for each symbol from among the predefined set of possible elements in the same manner as monitor 30 searched for ID codes in FIGS. 12–14. For example, the monitor would search the first symbol for the codes representing 00 then 01, then 02, etc. through 99. After finding the code for the-first symbol, the algorithm proceeds successively through the next two symbols repeating the search process for the respective symbol codes. When the monitor has completed the search through all three symbols of the example, it will have obtained the three numbers communicated by the sender and in the process will have distinguished the code of that sender from among 1,000,000 possible codes. For the purpose of insight, each sender in the foregoing symbol based system can be thought of as three senders bundled together with a common group synch. The monitor sequentially recognizes each symbol in the manner that sender IDs are recognized in the previously discussed pulse embodiments.

The embodiment of FIG. 17 allows the possible participation of very large numbers of senders in a system. As in the previously discussed embodiments, the number of senders present simultaneously in the range of the monitor is ultimately constrained by the overall pulse density. In general more pulses are required to transmit more symbol elements; so in most cases, the maximum number of senders that can operate in the field of a monitor is reduced as the sender's code is elaborated with more pulses.

Multiple symbol coding can be used to greatly expand the number of possible identity codes: alternatively, the symbols can be employed to transmit multiple distinct data items. Illustrating a practical application of the latter, senders of a symbol based system might be affixed to shipping cartons and used to signal the destination, in addition to the contents or identity, of each carton as it passes down a conveyor in a freight handling facility.

The monitor 400 of FIG. 17 is depicted as monitoring three symbols. A distinct code repertoire for each symbol is stored in storage blocks 410, 412, 414. In operation the sequence and control logic 420 first searches for the GS pattern stored in memory 422 in the same manner as in FIG. 12. Each of the GS intervals is successively loaded into the bit address register 426 thereby selecting the particular sequence of bits in the shift register for examination. If all of the GS bits are found to be present, synchronization is recognized and a search for symbol 1 intervals is initiated. The code repertoire table for symbol 1 will contain a significant number of codes. Each code in the repertoire table is tested for a match in the shift register. When a match is found, the sequence and control logic 422 advances to process the next symbol in like fashion. This process proceeds through all symbols.

GS/SINGLE PULSE VARIANT

In a GS embodiment, e.g. FIG. 12, analog or digital data, as well as simple presence or absence, can be communicated to the monitor by the sender. Several examples of this capability are described in the following paragraphs. The capabilities become operative and are dependent upon first achieving synchronization to a particular sender utilizing the GS and ID techniques previously described (e.g., FIG. 12).

1. Binary Status via a Single Pulse Intearated Over Time

Figure 18:
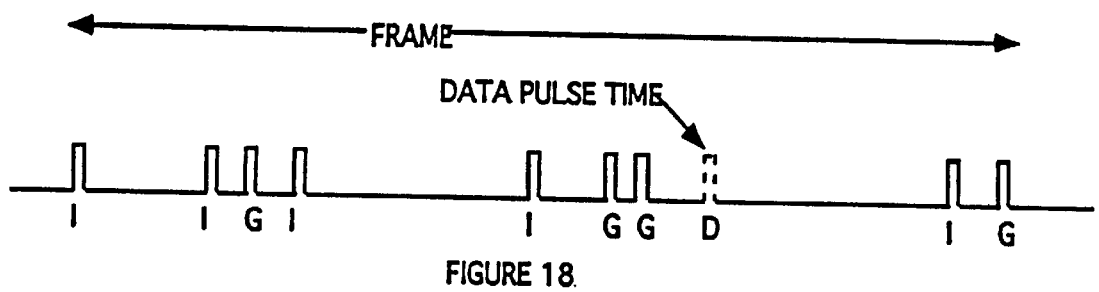
FIGS. 18, 19, and 20 represent frame format variants depicting the inclusion of one or more data pulses within a frame.

Low bandwidth binary data can be reliably communicated by means of a single additional pulse within the previously described format comprised of GS and sender ID pulses. As illustrated in FIG. 18, specific pulse positions in the sender's transmission frame are designated for data pulses. Such data pulses can then be used to indicate binary status for various applications such as battery low indication, window open indication, over-temperature indication, tip-over indication, valve open indication, moisture detect indication, etc.

Such slow-changing data item pulses can be detected with high confidence over a period of several successive transmission cycles. By accumulating or integrating the signal from one or more such specific data pulse positions over multiple transmissions, the influence of noise or extraneous sender pulses can be effectively eliminated. For example, consider the processing of a particular data pulse from a particular sender. Each time that the monitor detects this sender it overtly samples the additional data pulse position. The binary status of this indicator pulse is determined after multiple successive reads of this pulse position. For example, the signal could be accumulating over eight successive reads. The binary state would be determined as true when, for example, 7 of the previous 8 reads were found to be true. The binary state would be determined as false if less than 7 of the past 8 reads were true. This is a particularly efficient mode of data communication because only a single pulse need be employed to communicate binary status.

Multiple binary status indicators could be transmitted by a sender by incorporating multiple data pulse positions in the waveform. For example, a sender having four such data pulse positions could transmit it's battery status and the status of three additional binary data items. The additional data items may be indigenous to the sender device or may be associated with electrical signals that are connected to the sender device by means of wiring.

2. Analog Data Transmitted via the Position of Multiple Pulses

Figure 19:
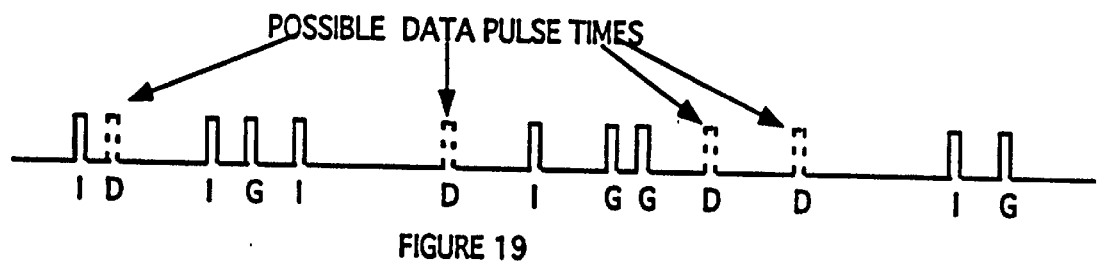

FIG. 19 depicts how multiple pulse positions can be employed to communicate low bandwidth analog data. For example, a sender incorporating four such data pulse positions could use those four pulse positions to encode a low resolution representation of the battery depletion level or the environmental temperature or the flow rate in a pipe. When transmitting analog data items using pulses by this technique, differentiating against noise and extraneous sender pulses is accomplished by accumulating the individual pulse signals over multiple successive transmissions. Having thus detected the individual pulses, those pulse positions can then be associated with binary bit positions to allow decoding of the digital value.

3. Analog Data via the Intearated Position of a Single Pulse

Figure 20:
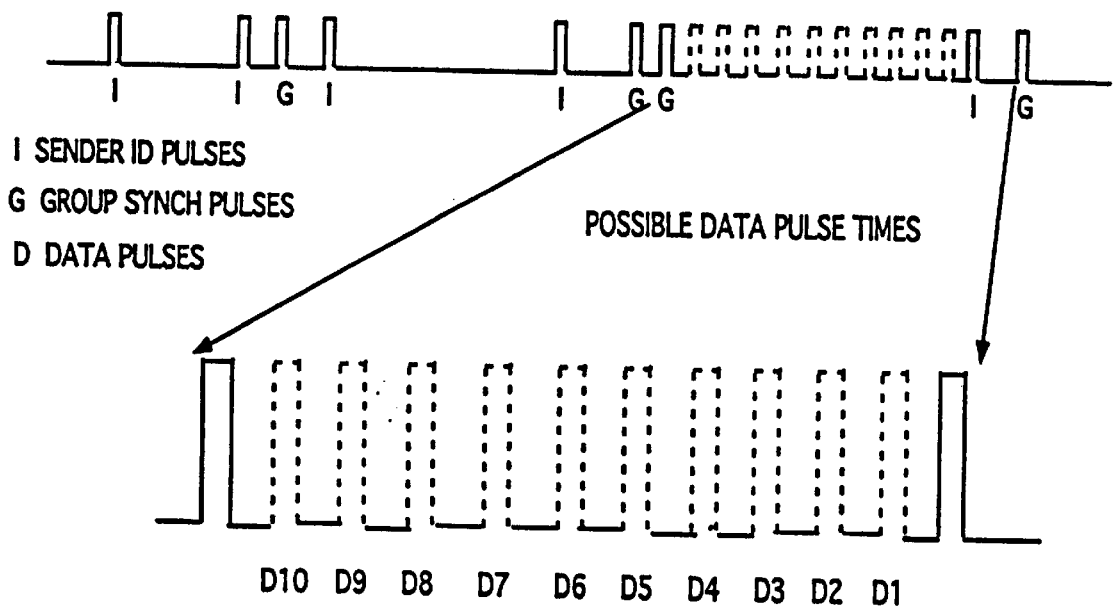

In yet another example, analog data values can be encoded by the position of a single pulse. Consider a sender of the general design as previously described wherein synchronization is established by the GS technique described for sender identification. Consider that this sender's waveform includes a field of possible pulse positions for encoding analog information as indicated in FIG. 20. A continuous signal is encoded by the position of a single pulse in this field.

This embodiment presents a particularly efficient mechanism for transmitting analog information. It is effective for low bandwidth signals. Like the previous embodiments, this scheme relies upon accumulating and detecting the pulse position signal over multiple sender transmissions.

Extraneous pulses due to other senders or environmental noise can be expected. But, such extraneous pulses are removed by the integration process associated with the accumulation of the pulse signal over multiple transmissions.

4. Digital Data via Multiple "ID" Pulse Sets

In yet another example, communication of digital information at higher bandwidth is accomplished. By this technique, each sender is assigned multiple long pulse pattern identities. This embodiment does not rely upon signal accumulation over multiple cycles. Rather, relatively fast response is achieved by the techniques previously described for sender identification.

Consider, for example, a particular sender that contains in its memory four complete pulse pattern identity sequences. In the monitor's search repertoire all four of these identity sequences are associated with the one sender. The effect is as if there were four senders bundled into one.

Binary information is conveyed to the monitor by determining which identity sequences are being received. In this example, four pulse pattern identity sequences provide the capability to discern two binary state conditions. Such binary state's might indicate, for example, whether a door is open or closed and whether an infrared motion sensor has detected a person as present.

Information of this type can change more frequently; state changes might be expected over the time frame of a single sender transmit cycle.

In a practical implementation, more than one of the foregoing examples could be employed in a single device application. For example, a single sender device might include provision to indicate its battery status by means of a single binary pulse and the same sender could employ multiple identities to transmit an external binary input. That sender might also incorporate a pulse position field to transmit an analog temperature measurement.

ACQUISITION OF REPERTOIRE

Each of the basic embodiments of this invention requires that the monitor include a repertoire of ID codes. The following are some methods of acquiring that repertoire.

a. Pre-programmed in non-volatile memory at the factory.
b. Uploaded from a host;
c. Programmed into the unit by means of a keypad or other manual switch-input arrangement in the field;
d. Learning sender ID codes by excluding other, more distant, inputs to the monitor;
e. Learning sender ID codes by direct electrical contacts or by an auxiliary channel such as an IR LED;
f. Learning sender ID codes by repeated recognition.

Method a, b, and c are self-explanatory. Methods d, e, and f are described in the following.

d. Learning Sender ID by Excluding Other, More Distant, Inputs to the Monitor

Figure 21:
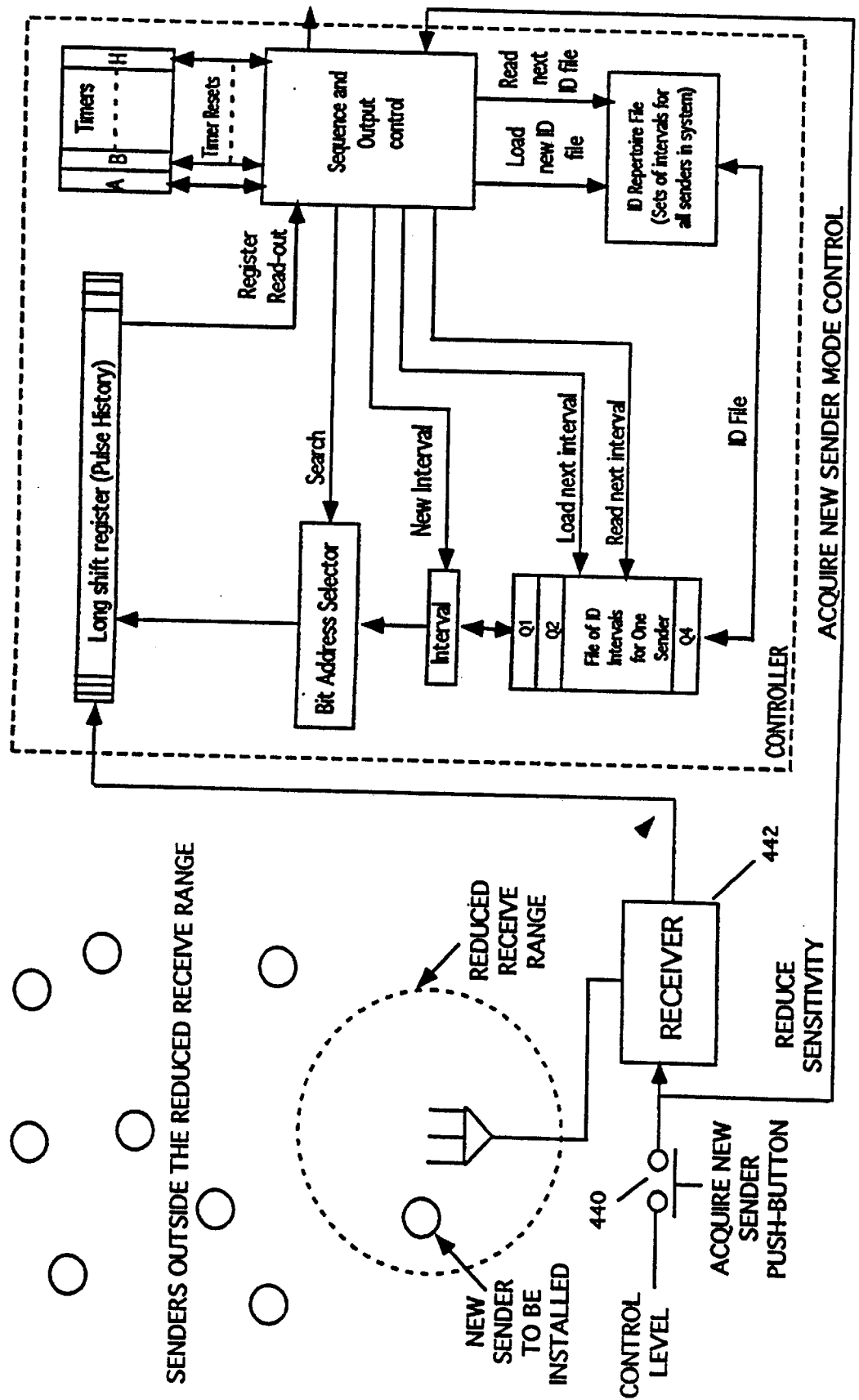
FIGS. 21 and 22 are block diagrams similar to FIG. 9 but expanded to exemplify how the monitor repertoire can acquire ID codes.

FIG. 21 illustrates the installation of a new sender's ID code by temporarily limiting the receive range of the monitor. A push button 440 causes the system to enter a special, acquire-new-sender, mode that reduces the sensitivity of receiver 442 and enables the monitor to recognize and store a new sender's ID in it's repertoire.

The new sender to be installed is physically placed within the receiver's now reduced range. Only that sender's ID is received by the monitor since all other senders are outside the reduced range. In it's normal process, the monitor receives and tests the sender's ID code to determine if it has been previously installed. If not, the new sender ID code is installed in the monitor's repertoire. The acquisition process continues for as long as the pushbutton is depressed FIG. 21 illustrates the acquisition process for the Pulse (FIG. 9) and the Pulse/GS (FIG. 12) embodiments. The process is similar for the Code burst embodiments. Cuing on the final pulse in a burst, the monitor conducts a search of its repertoire for a matching ID. If none is found, the monitor proceeds to determine the ID of the new sender as stored in the long shift register. In that process the "SEQUENCE CONTROL" searches for true bits in the shift register by causing the "BIT ADDRESS SELECTOR" to increment through it's range. The interval between successive true bits is logged by the "SEQUENCE CONTROL" and then transferred to the "INTERVAL"register. Intervals thus determined are loaded into the "FILE OF ID INTERVALS". When all intervals are determined, the completed ID code is transferred to the "ID REPERTOIRE FILE".

e. Learning by Direct Electrical Contacts or by an Auxiliary Channel

Figure 22:
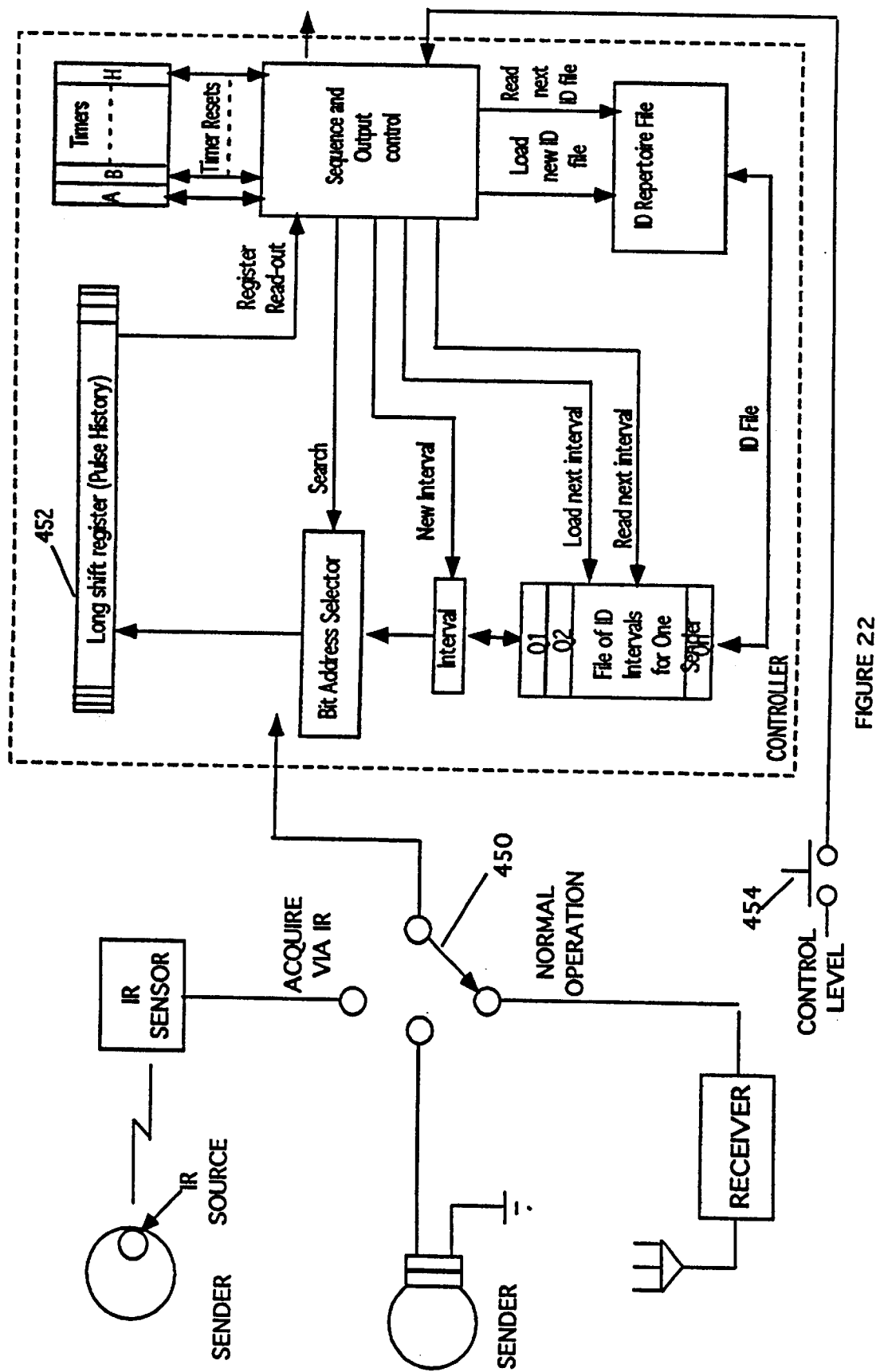

FIG. 22 illustrates a system arranged to permit several methods of acquiring new sender ID codes. As illustrated, a selector switch 450 determines the method. When the selector switch is moved to the "Direct Electric" position, electric pulses from the sender coincident with its transmitted pulses are input to the "LONG SHIFT REGISTER" 452. When the "ACQUIRE NEW SENDER" pushbutton 454 is actuated, the monitor tests the received ID code. If it is found to be new, it is added to the ID Repertoire File.

When the selector switch 450 is moved to the "IR SENSOR"position, the sender emits infrared ID pulses which are loaded into the "LONG SHIFT REGISTER" 452.

f. Learning Sender ID Code by Repeated Recognition

A new sender ID code can be accepted for incorporation into the repertoire if it repeatedly occurs in conjunction with a GS pulse pattern.

As previously described, a composite signal sample is repeatedly shifted into the "LONG SHIFT REGISTER". With each new sample, the system first tests for group synch (GS). The GS intervals are transferred to the "BIT ADDRESS SELECTOR" one at a time. With each GS bit address, the "SEQUENCE CONTROL" monitors the selected bit position output of the shift register. As long as the bit is recognized as true (indicating a pulse received at that previous sample time), the sequencing continues. If one bit is missing, the process aborts on the determination that group synch is absent. When the group synch test runs to completion, that indicates that group synch has been detected.

When group synch is detected, the monitor first exercises the normal sender ID search process as previously described and illustrated. Then, only if a known sender in the ID Repertoire file is not recognized by the normal search process, it may be tentatively presumed that a new unknown sender has entered the field of the monitor unit. At that juncture, the sequence and control logic begins testing for a new sender ID pattern. A valid new sender ID pattern comprises a fixed number of pulse detections within a defined time window. That fixed number of pulses must occur in the clear. That is, with no other sender's pulses interfering.

The "SEQUENCE CONTROL" increments the "BIT ADDRESS SELECTOR" through the possible ID pulse positions, excepting those associated with the GS pulse positions. The output of the shift register at the selected positions is passed to the "SEQUENCE CONTROL"which accumulates a count of "hits".

Further, the interval between successive hits is passed to the "FILE OF ID INTERVALS". This file contains the tentatively determined ID pulse intervals. Upon completion of testing all possible ID pulse positions, the total number of hits is checked to determine if it matches an established threshold. If it does, the new sender is recognized.

At this juncture, the new sender ID code is regarded as tentative subject to confirmation by detection a second time. If the same sequence of intervals is detected again within the repetition interval of the sender, then the new sender detection is confirmed with high confidence since the coincidence of signals from other senders could not have generated successive identical false ID codes within a short time period. The new ID code is transferred to the "ID REPERTOIRE FILE" upon receiving the confirming detection.

SENDER BATTERY CONSERVATION

One of the advantages of the foregoing described sender/monitor embodiments is the very low battery current drain of the senders. By virtue of that advantage, it is practical and advantageous to incorporate a non-replaceable battery in the senders. Further, it is contemplated that in some applications the sender may be sealed as protection against the elements. That could also render the battery nonreplaceable.

For reasons of test, the RF environmental protection, and unpredictable delay between manufacturing the sender and placing it in application, it can be beneficial to incorporate a means to turn senders ON and OFF, or at least to decrease their current drain when not in use. FIGS. 23A–23E disclose various embodiments of the invention which accomplish that.

In FIGS. 23A and 23B, a manually operable switch is used to implement the "on/off" function. As illustrated in FIG. 23C, the switch can be actuated through the flexible outer case of the sender. A clip type device as is illustrated in FIG. 23C can be used to hold the sender "off" when it is not in use. In FIG. 23A power is removed completely from the sender circuitry. That may not be desirable in some applications because of certain necessary keep-alive functions. FIG. 23B illustrates the switch removing a dc level from the micro-controller to cause it to be in a reduced power, but alive, mode.

Instead of the manually operable switch used in FIGS. 23A, 23B, a magnetic reed switch can be used which can be actuated by an external magnet.

Figure 23D:
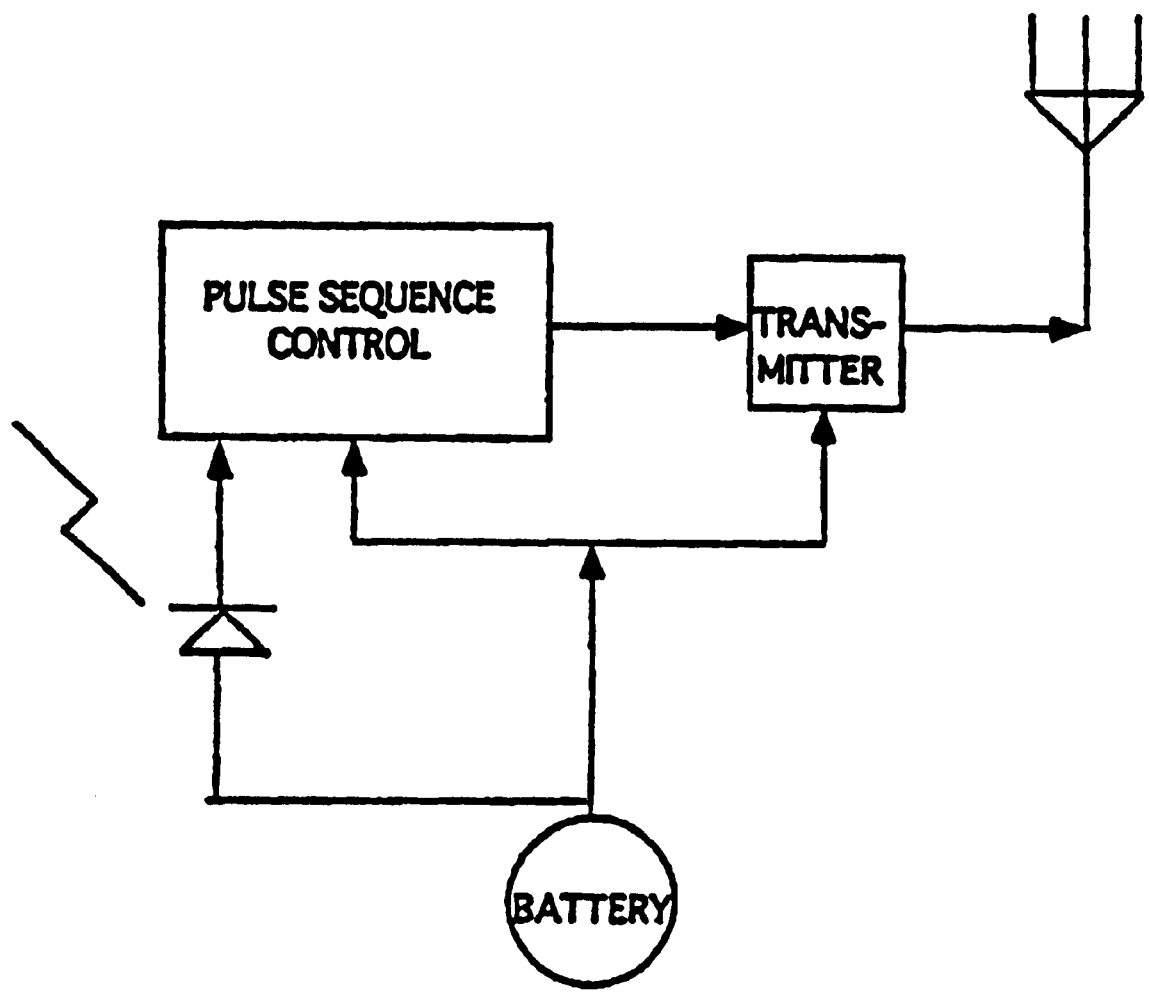
Figure 23E:
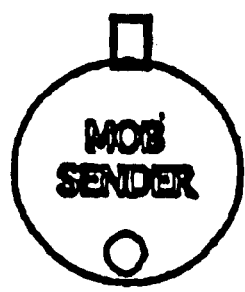

FIGS. 23C and 23D illustrate an embodiment in which a phototransistor or photodiode is arranged to sense light falling on the sender. Detection of adequate light intensity initiates a timing sequence within the circuitry of the sender that results in turning the sender ON either permanently or for some defined time interval, for example, 24 hours. While the sender is initially enclosed in an opaque container (e.g. box or wrapper) or, in the second instance, enclosed for longer than 24 hours, it is held OFF. Either method will conserve the sender battery from the time the sender is manufactured until it is first put into service.

For applications that are assured of operating in light during some period of a 24 hour cycle, the on and off control method provides a means to shut down the sender when it is not in service. A sender attached on a person, for example, could benefit from this additional battery conservation feature. On or off is determined by light impinging the sender.

As illustrated in FIG. 23D, a photo sensor is located behind a window in the sender housing. When not in use the sender is kept in darkness. Absence of light causes the sender to switch to its reduced power mode. When placed in service, the sender is exposed to light and returns to full normal operation.

SENDER BATTERY STATUS REPORT

In some critical applications it is necessary to know the life remaining for the battery powering the sender. This is particularly true in the case of senders energized by permanently installed batteries where precautionary replacement is not an option. Techniques for discerning and communicating battery life remaining are depicted in FIGS. 24A, 24B.

Figure 24A:
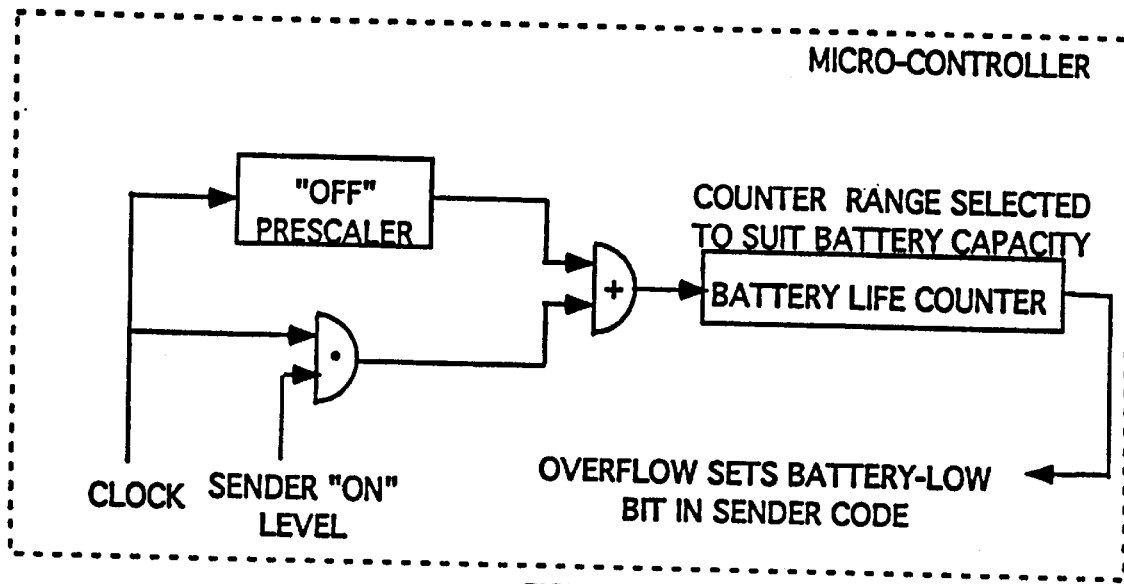
FIGS. 24A and 24B schematically depict arrangements for discerning sender battery status.

In the method illustrated in FIG. 24A each sender includes a register that logs the accumulated ON time and a second register that logs accumulated OFF time. The ON time is scaled to the average power ON current consumption and the measured OFF time is scaled to the lower current consumption associated with sender standby current consumption and/or battery self-discharge. The resulting battery estimate is communicated to the monitor as part of the sender's transmitted signal. This method can be implemented in conjunction with any of the monitor embodiments disclosed.

Figure 24B:
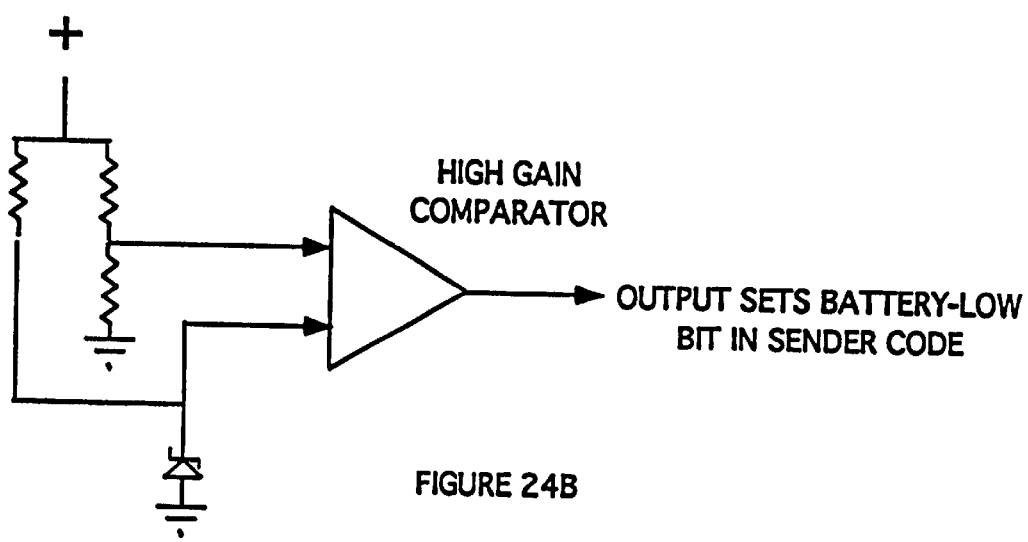
Figure 25:
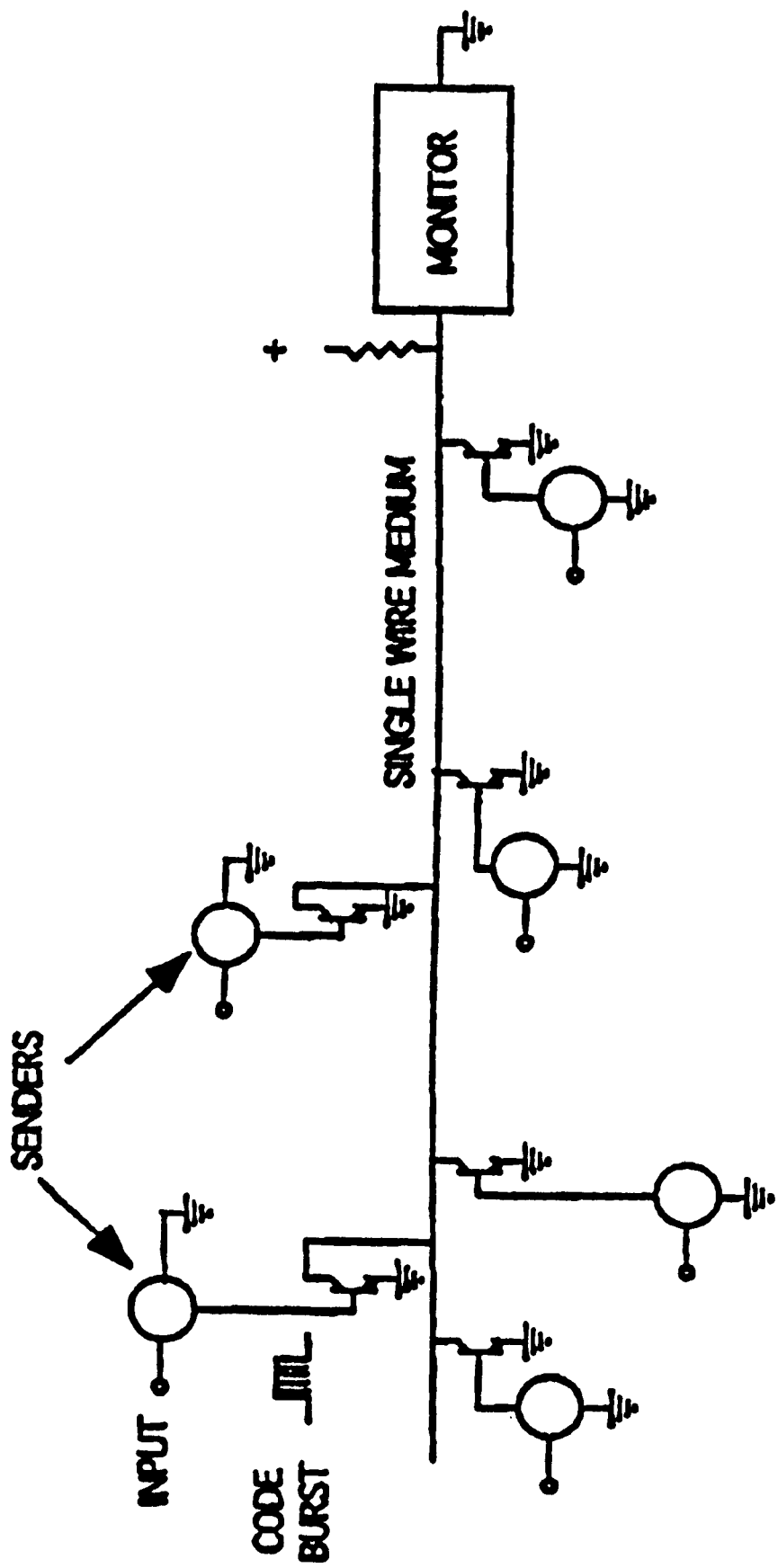
FIG. 25 is a functional block diagram of a system in accordance with the invention using a wire as the communication medium.

In a further alternative embodiment, illustrated in FIG. 24B, the battery status report is developed from the actual battery voltage. At a predefined critical level the sender's transmitted code is modified to communicate its critical voltage status.

TYPICAL SPECIFICATIONS

The following are exemplary specifications that could be applicable in various embodiments of the invention. They are not intended as limits or bounds but rather as convenient, realizable, and practical values.

RF frequency—433 Mhz
Radio range—3 to 600 feet
Active senders per monitor—2 to 1,000
Total sender population per monitor—to one million
Pulse widths—10 to 500 microseconds
Sampling resolution—one-half pulse width
Number of serial code pulses (where applicable)—3 to 30
Number of repeat cycles (where applicable)—2 to 10
Number of synch pulses (where applicable)—2 to 10
Number of ID pulses (where applicable)—3 to 30
Number of symbol pulses (where applicable)—3 to 20
Cycle repeat period—0.5 to 30 seconds
Quiet interval duration—10 to 100 pulse widths

REDUNDANCY CONSIDERATIONS

Code redundancy has a critical role in all embodiments of this invention. As used here redundancy is defined to be the over-determination or over-identification of code by repetition or by multiplicity of representation.

In the serial code burst embodiment (FIG. 3), each sender repeats the code burst at different intervals in order to enhance the prospect of completing a code transmission without encountering a collision (i.e. interference from the code transmissions of other senders). The code is redundant in that multiple repetitions occur during each time out interval. The consequence of redundancy in the serial code burst embodiment is primarily to reduce the probability of missed detections that might otherwise arise due to disruption of the defined code pattern.

In the Pulse and Pulse/GS embodiments (FIGS. 9, 12) there is redundancy during each identification frame that is conferred by the elaboration of the transmitted pulse pattern sequence. More pulses are employed in the code than are minimally necessary to distinguish a given sender from all other senders. Excess pulses serve to enhance the prospect that despite a substantial fraction of pulse collisions among the signals transmitted by the population of senders, there exists a high probability that a sufficient number of pulses remain in-the-clear to uniquely distinguish each sender. The consequence of redundancy in the Pulse embodiment is primarily to reduce the probability of false detections.

This benefit of redundancy that arises from the invention can be examined via FIG. 9. In FIG. 9, the ID code consists of five pulses. For convenience in this example, let us assign the number of senders in the population to be 64 and let us define the number of possible positions for each pulse to be 64. Each pulse position can then designate any one from among the 64 different senders. For example, sender A could be designated by position 1, sender B could be designated by position 2, etc.

Since there are five pulses in the illustrated ID frame and one pulse is sufficient to uniquely designate any of the 64 senders in our population, clearly the additional four pulses are redundant. Taken collectively, the set of five pulses could have been employed to distinguish up to $64^5$ or roughly 100 million senders. The difference between 64 and $64^5$ illustrates the redundancy effect obtained by incorporating the additional four pulses.

Thus, redundancy serves to reduce the probability of false detections. For the pulse embodiments, at each sample, the probability of a false detection for a particular ID code in the repertoire, can be shown to be:

$$P_f = (bN\,x)^x$$

Where $P_f$ is the probability of a false detection at each sample, b is the ratio of pulse width to repetition interval, N is the number of senders in the environment of the reader, and x is the number of pulses transmitted by each sender.

In the illustrative system represented by the pulse diagram of FIG. 9, we can incorporate some practical assumptions: let's say that the pulses are 200 microseconds in duration and the transmitted pulse patterns repeat every 3 seconds so that:

$$b = \frac{200\ \mu sec}{3 \times 10^6\ \mu sec} = 6.66 \times 10^{-5}$$

Accordingly, for a system utilizing just two pulses, the probability of a false detection at each sample is:

$$P_f = [(6.6 \times 10^{-5})(64)(2)]^2 = 7.3 \times 10^{-5}$$

By similar calculation if the number of pulses is increased to three, four and five then the probability of false detection, $P_f$, is reduced as follows:

Two pulses $P_f = 7.3 \times 10^{-5}$
Three pulses $P_f = 2.1 \times 10^{-6}$
Four pulses $P^f = 8.5 \times 10^{-8}$
Five pulses $P^f = 4.4 \times 10^{-9}$ Thus, when this illustrative system employs an overdetermined pattern of five pulses rather than two pulses, the probability of a false detection reduces by a factor of approximately ten thousand.

PERFORMANCE ANALYSIS AND DERIVATION

Performance of systems using a pulse format, as exemplified by FIG. 9, can be characterized by the equation:

$$P_f = (bNx)^x$$

The following paragraphs provide derivation and analysis of that equation. The analysis concludes that an optimum combination of parameters is obtained when the density, D, of pulses is:

$$D = e^{-1} = 37\%$$

The Pulse and Pulse/GS embodiments rely, in part, on statistical behavior to achieve accurate discrimination against false detection of senders. A false detection can occur under the happenstance that pulses from two or more senders combine in a manner that exactly mimics the pattern of a sender that is stored in the repertoire of the monitor. Clearly, the more elaborated the pulse pattern the less likely this will happen. Elaboration of the sender's pulse pattern is achieved by increasing the number of pulses that comprise a sender's transmission.

The probability of mimicking a particular sender's pattern can be computed as the combined probability that each and every pulse in the sequence will be spoofed by an extraneous sender pulse. When sender ID codes are pseudorandomly generated, the theory of independent probabilities applies. If the probability of falsely detecting the first pulse is $p_1$ and the probability of falsely detecting the second pulse is $P_2$, then the probability that both are falsely detected at the same correlation trial is:

$$p_f = p_1 p_2$$

Clearly, the chance of a false hit on any particular pulse position is the same as any other; that is $p_1 = p_2 = p$. So, for x number of pulses, the probability that all pulses are falsely detected is:

$$P_f = p^x$$

Now, the probability of falsely detecting a single pulse is equal to the frequency or density of pulses in the environment. This overall density of pulses, D, is due to the combined random transmissions of the population of senders in the environment of the monitor. So, p=D; therefore:

$$P_f = D^x$$

The overall density of pulses is related to the number of senders in the environment of the reader, N, and to the number of pulses transmitted per sender, x, and to the signal density contribution associated with each individual pulse. The latter is defined as follows:

$$b = \frac{pulse\ width}{repetition\ interval}$$

Where the pulse width refers to the pulse width of the individual pulses and repetition interval is the time between pattern transmit cycles.

Combining those factors, the overall signal density can be expressed as:

$$D = bN$$

Substituting that into the expression for $P_f$, we get the performance equation of the system:

$$P_f = (bNx)^x$$

An alternative expression for performance can be derived for the maximum number of senders, $N_0$, which can be detected to a specified false alarm rate, $P_{f0}$. This is obtained by solving the performance equation for N and substituting a specified performance criterion; $P_f = P_{f0}$:

$$N_0(x) = \frac{\exp\left[\frac{\ln(P_{f0})}{x}\right]}{bx}$$

The appropriate criterion for false alarms will clearly depend upon the particulars of the system application. For illustration, consider a 30-year false alarm criterion which would be regarded as ample for most applications. Also for illustration, consider a system employing practical design parameters as follow:

Pulse width=200 microseconds
Repetition interval=10 seconds
Sampling rate=10 Kilohertz Now, b can be computed as:

$$b = \frac{200(10)^{-6}}{10} = 2(10)^{-5}$$

And the 30-year false alarm criterion can be related to the probability of false detection at each sample by the following computation:

$$P_{f0} = \frac{1}{(30)(365)(24)(60)(60)(10)^4} = 10^{-13}$$

Using those particular design values, the plot below is the performance of the system, $N_0(x)$. That is, the maximum number of senders that can be located within the field of the monitor and still achieve the specified maximum false alarm rate of $10^{-13}$ false reports per sender per sample. The abscissa of the plot is, x, the number of pulses that each sender transmits for its unique pseudorandom pulse pattern. The plot clearly shows that the performance of the system peaks for a particular number of pulses, which in this case is 30. For this system, the maximum number of senders is approximately 610; if more than 610 senders are in the environment of the or, then the false alarm rate is expected to exceed the 30-year design creterion.

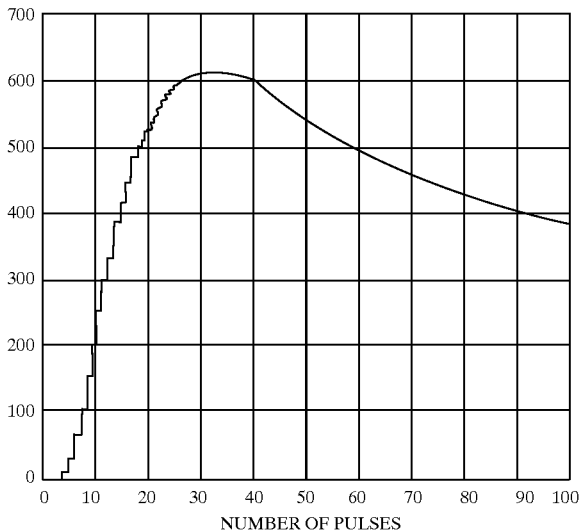

NUMBER OF PULSES

Clearly, different performance results will be obtained for different values of the time parameter b and for different values of the false alarm criterion $P_{f0}$. It should also be advised that the results derived here represent a theoretical maximum achievable performance. Practical considerations can diminish this performance somewhat.

One practical consideration relates to the previously given assumption that the probability of pulse occurrences are independent. To the extent that pulses issued by a sender are bunched together to make distinct sender transmission intervals, then the independence assumption is not entirely valid. Bunching can have the effect of increasing the false alarm probability. Nonetheless, the theoretical performance is well approximated when the pulse pattern transmissions are long enough in duration that the density of pulses from a single sender is much less than the overall density, D. This translates to a requirement that the individual senders should transmit a pattern that is long in duration and thereby sparsely populated with pulses in order to approximate the theoretical performance derived.

It is instructive to examine the condition of peak performance more closely. Returning to the performance equation, we had:

$$P_f = (bNx)^x$$

The minima of $P_f$ (peak performance) occurs where the derivative of the performance equation is equal to zero. This derivative is of the form $y = u^v$ where $$\frac{du}{dx} = bN \text{ and } \frac{dy}{dx} = 1$$

Thus, $$\frac{dP_f}{dx} = (bNx)^x [1 + \ln(bNx)] = 0$$

Noting that the left hand term cannot be zero except in the trivial case, we get:

$$\ln(bNx) = -1$$

So, $$bNx = e^{-1}$$

Now, recognizing that bNx is identically the pulse density D, we get the result that under conditions of peak performance:

$$D = e^{-1} = 37\%$$

This result is general in that it applies for any set of parameters that may be chosen. A significant conclusion is that a system should not be designed to operate at a pulse density greater than 37%. Simply reducing the number of pulses transmitted by the sender will always improve the performance if that threshold is exceeded.

CONCLUSION

The aforedescribed embodiments of the invention can be implemented using various forms of communication. Although radio signal communication may be the most evident, it is important to note that several alternative mediums of communication can be employed. Any medium that provides senders with at least a single common channel for communication with the monitor is suitable. Some examples are: a single wire and ground connecting all system senders to a single monitor, ultrasound transmitters at each sender operating with an ultrasound receiver at a monitor, and infrared transmitters at each sender which communicate with an infrared receiver at a monitor.

All of the aforedescribed embodiments can be variously implemented either in hardware or in software or in a combination of the two. For example, the timing interval files can be implemented as a RAM buffer. Likewise, the long shift register can be implemented in RAM—in which case the bit address register may simply comprise a pointer which indexes into the register. The ID code repertoire file may be implemented in either RAM or ROM memory. In a software implementation, the sender timers would likely be implemented as RAM variables. Similarly, the controller can be implemented as a programmed microcontroller, as a state machine, or as a special purpose hardwired logic unit.

What is claimed is:

1. A system for monitoring the presence or absence of members of a defined set of members, said system comprising:

a plurality of senders each capable of asynchronously transmitting a uniquely encoded identification frame on a common communication channel to form a composite signal on said channel including identification frames from said plurality of senders, each sender being uniquely physically associated with a different one of said members;

each of said senders including electronic circuitry for repeatedly transmitting an a uniquely encoded identification frame comprised of alternating active and inactive intervals and where each uniquely encoded identification frame is characterized by a unique sequence of inactive interval durations;

said electronic circuitry including a controller for controlling the duration of each of said inactive intervals; and a monitor responsive to said composite signal for recognizing individual identification frames therein for determining the presence or absence of an identification frame unique to each sender, said monitor including:

storage means for storing a repertoire of identification frames;

accumulating means for accumulating a history of said composite signal; and comparator means for comparing said stored identification frames and said composite signal history to recognize the presence of individual identification frames in said composite signal.

2. The system of claim 1 wherein said electronic circuitry transmits at least one pulse during each active interval.

3. The system of claim 1 wherein said electronic circuitry transmits a coded pulse burst during at least one of said active intervals, said coded pulse burst defining a unique sender identification code.

4. The system of claim 1 wherein said electronic circuitry transmits a coded pulse burst during each of said active intervals, said coded pulse burst defining a unique sender identification code.

5. The system of claim 1 wherein said electronic circuitry of each of said senders introduces a common synchronization pulse pattern into each of said identification frames.

6. A system for monitoring the presence or absence of members of a defined set of members, said system comprising:

a plurality of senders each capable of asynchronously transmitting a uniquely encoded identification frame on a common communication channel to form a composite signal on said channel including identification frames from said plurality of senders, each sender being uniquely physically associated with a different one of said members;

each of said senders including electronic circuitry for repeatedly transmitting an identification frame comprised of alternating active and inactive intervals;

said electronic circuitry of each of said senders generating a uniquely encoded identification frame comprised of a unique sequence of inactive interval durations and including a controller for controlling the duration of each of said inactive intervals;

a monitor for and processing said composite signal for determining the presence or absence of an identification frame unique to each sender, said monitor including:

storage means storing a repertoire comprised of a different inactive interval duration sequence for each sender; and a detector for indicating whether said composite signal includes identification frames matching each sequence stored in said storage means.

7. The system of claim 6 further including:

an output device responsive to said detector indicating a match for reporting the presence of a member.

8. The system of claim 6 further including:

an output device responsive to said detector failing to report a match for a stored inactive interval duration sequence for reporting the absence of a member.

9. The system of claim 1 wherein said electronic circuitry in each of said senders includes a transmitter for generating a carrier signal and a controller for amplitude controlling said carrier signal to define said uniquely encoded identification frame.

10. The system of claim 9 wherein each transmitter in said plurality of senders generates a common carrier signal.

11. The system of claim 10 wherein said common carrier signal is a radio frequency signal.

12. A system for detecting the presence or absence of one or more members from a defined set of members, said system comprising:

a plurality of senders each capable of asynchronously transmitting a uniquely encoded identification frame on a common communication channel to form a composite signal on said channel including identification frames from said plurality of senders, each sender configured to be uniquely physically associated with a different one of said members;

each of said senders including a power supply, a transmitter configured to be driven by said power supply to generate a common carrier signal, and a controller for controlling said carrier signal to repeatedly transmit a uniquely encoded identification frame uniquely identifying the sender;

each of said identification frames comprising a pulse identification pattern comprised of a sequence of quiet intervals, each of said quiet intervals being bounded by successive pulse intervals; and wherein the pulse identification pattern produced by each sender is characterized by a unique sequence of quiet interval durations; and a monitor for receiving said composite signal comprising multiple pulse identification patterns transmitted by said plurality of senders and for recognizing each different transmitted pulse identification pattern therein;

repertoire means in said monitor for storing the characteristics of a plurality of different pulse identification patterns; and means for comparing said composite signal received by said monitor and the pulse identification patterns stored by said repertoire means to recognize the presence of individual identification frames therein.

13. The system of claim 12, wherein said means for comparing generates a match signal when said composite signal contains a pattern matching a stored pulse identification pattern; and an output device responsive to said match signal.

14. The system of claim 13 further including:

a timer defining a time-out period for each of said senders; and means responsive to the generation of a match signal for resetting the timer associated with the sender identified by that stored pulse identification pattern.

15. The system of claim 12 wherein each of said senders repeatedly transmits its unique pulse identification pattern.

16. A system for detecting the presence or absence of one or more members from a defined set of members, said system comprising:

a plurality of senders each capable of asynchronously transmitting a uniquely encoded identification frame on a common communication channel to form a composite signal on said channel including identification frames from said plurality of senders, each sender configured to be uniquely physically associated with a different one of said members;

each of said senders including a power supply, a transmitter configured to be driven by said power supply to generate a common carrier signal, and a controller for controlling said carrier signal to repeatedly transmit a uniquely encoded identification frame uniquely identifying the sender;

each of said identification frames comprising a pulse identification pattern comprised of a sequence of quiet intervals, each of said quiet intervals being bounded by successive pulse intervals; and wherein the pulse identification pattern produced by each sender is characterized by a unique sequence of quiet interval durations; and a monitor for receiving said composite signal comprising multiple pulse identification patterns transmitted by said plurality of senders and for recognizing each different transmitted pulse identification pattern therein; and wherein each of said senders repeatedly transmits a coded pulse burst defining a unique sender identification code during at least one pulse interval of said identification pulse pattern.

17. The system of claim 16 wherein each of said controllers further controls said carrier signal to impose thereon a pulse synchronization pattern common to all of said senders.

18. The system of claim 17 wherein the pulse identification pattern of each sender is synchronized to said pulse synchronization pattern.

19. The system of claim 18 including means in said monitor for detecting a pulse synchronization pattern in said received composite signal; and means responsive to the detection of said pulse synchronization pattern for searching for a pulse identification pattern.

20. The system of claim 18 wherein said monitor includes means for storing a pulse synchronization pattern and a plurality of pulse identification patterns;

means responsive to said received composite signal containing a pattern matching said stored synchronization pattern for producing a sync match signal; and means responsive to said sync match signal for comparing said received composite signal with said stored pulse identification patterns.

21. The system of claim 12 wherein the durations of said quiet intervals are pseudorandomly determined.

22. A system for detecting the presence or absence of one or more members from a defined set of members, said system comprising:

a plurality of senders each capable of asynchronously transmitting a uniquely encoded identification frame on a common communication channel to form a composite signal on said channel including identification frames from said plurality of senders, each sender configured to be uniquely physically associated with a different one of said members;

each of said senders including a power supply, a transmitter configured to be driven by said power supply to generate a common carrier signal, and a controller for controlling said carrier signal to repeatedly transmit a uniquely encoded identification frame uniquely identifying the sender;

each of said identification frames comprising a pulse identification pattern comprised of a sequence of quiet intervals, each of said quiet intervals being bounded by successive pulse intervals; and wherein the pulse identification pattern produced by each sender is characterized by a unique sequence of quiet interval durations; and a monitor for receiving said composite signal comprising multiple pulse identification patterns transmitted by said plurality of senders and for recognizing each different transmitted pulse identification pattern therein; and wherein the durations of said quiet intervals fall within a range having an average duration considerably longer than the duration of a pulse interval.

23. A method for determining whether or not each of a plurality of sender is present within a detection zone, comprising the steps of:

causing each of said senders to generate a unique identification frame comprised of active and inactive intervals wherein the identification frame of each sender includes at least one pulse during each active interval and a unique ID sequence comprising a unique identification pulse pattern defining a unique sequence of inactive interval durations;

causing each of said senders to repeatedly apply its identification frame to a common communication channel;

allowing said Plurality of senders to asynchronously apply their respective identification frames to said common communication channel to form a composite signal;

causing each of said senders to introduce a common synchronization pulse pattern into each identification frame applied to said common communication channel;

monitoring said common communication channel to process said composite signal;

storing a repertoire of ID sequences, each uniquely associated with a different one of said defined plurality of senders;

processing said repertoire to ascertain whether each stored ID sequence is presented in said composite signal;

determining from said processing step whether or not each sender has applied its unique identification frame to said common communication channel; and determining whether said composite signal contains said common synchronization pulse pattern prior to processing said repertoire.

24. A method for determining whether or not each of a plurality of senders is present within a detection zone, comprising the steps of:

causing each of said senders to generate a unique identification frame comprised of active and inactive intervals wherein the identification frame of each sender includes a unique ID sequence of inactive interval durations;

causing each of said senders to repeatedly apply its identification frame to a common communication channel;

allowing said Plurality of senders to asynchronously apply their respective identification frames to said common communication channel to form a composite signal;

monitoring said common communication channel to process said composite signal;

storing a repertoire of ID sequences, each uniquely associated with a different one of said defined plurality of senders;

processing said repertoire to ascertain whether each stored ID sequence is presented in said composite signal;

determining from said processing step whether or not each sender has applied its unique identification frame to said common communication channel;

maintaining a history of inactive interval durations of said composite signal; and wherein said step of processing includes the step of comparing said stored repertoire with said composite signal history.

25. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal; and wherein said monitor includes:

a register for accumulating a history of composite signal pulses;

a memory for storing a repertoire of pulse patterns; and a comparator module for comparing pulse patterns stored in said memory with said history of composite signal pulses.

26. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal; and wherein each said first pulse pattern is synchronized relative to said second pulse pattern in each of said identification frames.

27. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal;

said monitor including a controller for recognizing when said composite signal presents said common first pulse pattern; and wherein said monitor controller responds to said recognition for generating a check-in signal for each sender when said composite signal presents a second pulse pattern associated with that sender.

28. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal;

said monitor including a controller for generating a first match signal when said composite signal presents said common first pulse pattern;

said monitor controller including means storing a repertoire of sender second pulse patterns; and means responsive to said first match signal for comparing each of said repertoire of second pulse patterns to said composite signal.

29. The system of claim 28 wherein said means for comparing includes means for sequentially comparing said repertoire of second pulse patterns to generate a sender check-in signal when a compared second pulse pattern matches a pulse pattern presented by said composite signal.

30. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal; and wherein each of said second pulse patterns is comprised of at least three pulse intervals bounding a unique sequence of quiet interval durations in said identification frame.

31. The system of claim 30 wherein each frame first pulse pattern is comprised of at least first and second pulse intervals fixedly positioned in said frame; and wherein at least one of said first pulse pattern pulse intervals coincides with one of said second pulse pattern pulse intervals in each of said identification frames.

32. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal; and wherein each of said sender second pulse patterns is comprised of at least first and second subpatterns;

said monitor including a controller for recognizing when said composite signal presents said common first pulse pattern; and wherein said monitor controller is responsive to said recognition for separately identifying said first and second subpatterns.

33. A system for monitoring the presence or absence of each of a plurality of senders within the detection zone of a monitor, said system comprising:

each of said senders including a controller for generating an identification frame including first and second pulse patterns wherein said first pulse pattern is common to said plurality of senders and said second pulse pattern is comprised of a unique sequence of inactive interval durations uniquely associated with the generating sender;

a common communication channel;

said sender controllers being operable to asynchronously and repeatedly apply their respective identification frames to said communication channel to collectively form a composite signal on said channel;

a monitor coupled to said channel for processing said composite signal to separately identify each sender identification frame contained in said composite signal; and wherein said common first-pulse pattern is comprised of at least two pulses fixedly positioned in each identification frame and spaced by a quiet interval of fixed duration; and wherein each sender second pulse pattern is comprised of at least three pulses in each identification frame spaced to define multiple quiet intervals, each sender second pulse pattern being comprised of a unique sequence of quiet interval durations.

34. The system of claim 33 wherein said first and second pulse patterns in each identification frame are interleaved.

35. The system of claim 33 wherein said first pulse pattern and each of said second pulse patterns are synchronized in each of said identification frames.

* * * * *